(12) United States Patent
Nah et al.

(10) Patent No.: US 10,437,403 B2
(45) Date of Patent: Oct. 8, 2019

(54) TOUCH PANEL

(71) Applicant: LG INNOTEK CO., LTD., Seoul (KR)

(72) Inventors: Hyun Min Nah, Seoul (KR); Kyoung Jin Kim, Seoul (KR); Hyung Jun Park, Seoul (KR); Ji Won Jo, Seoul (KR); Mun Suk Kang, Seoul (KR); Gwang Hei Choi, Seoul (KR); Beom Sun Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 14 days.

(21) Appl. No.: 15/944,984

(22) Filed: Apr. 4, 2018

(65) Prior Publication Data
US 2018/0224974 A1 Aug. 9, 2018

Related U.S. Application Data

(63) Continuation of application No. 14/625,082, filed on Feb. 18, 2015, now Pat. No. 9,965,112.

(30) Foreign Application Priority Data

| Jul. 30, 2014 | (KR) | 10-2014-0097155 |
| Sep. 29, 2014 | (KR) | 10-2014-0130024 |
| Oct. 1, 2014 | (KR) | 10-2014-0132473 |
| Jan. 19, 2015 | (KR) | 10-2015-0008838 |

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC .......... G06F 3/044; G06F 2203/04103; G06F 2203/041; G06F 3/03547; G06F 3/041; G06F 3/0412; G06F 3/0414; G06F 3/0416; G06F 3/0418; G06F 3/046; G06F 3/047; H05K 9/0073; H05K 9/0079; H05K 9/0081; H05K 9/0088
See application file for complete search history.

(56) References Cited

U.S. PATENT DOCUMENTS 8,294,677 B2 10/2012 Wu et al.
8,330,738 B2 12/2012 Hung et al.
(Continued)

FOREIGN PATENT DOCUMENTS

CN 202838253 3/2013
CN 203706172 7/2014
(Continued)

OTHER PUBLICATIONS

Chinese Office Action dated Nov. 3, 2017 issued in Application No. 201510086905.X (English translation attached).
(Continued)

*Primary Examiner* — Premal R Patel
(74) *Attorney, Agent, or Firm* — Ked & Associates, LLP

(57) ABSTRACT

A touch panel according to the embodiment includes: a cover substrate including an active area and an unactive area; an intermediate layer on the cover substrate; and an electrode on the intermediate layer, wherein the intermediate layer includes an acrylic resin composition.

20 Claims, 21 Drawing Sheets

(56) References Cited

U.S. PATENT DOCUMENTS

| | | | |
|---|---|---|---|
| 2008/0264699 A1* | 10/2008 | Chang ............... G06F 3/044 178/18.01 | |
| 2009/0104440 A1 | 4/2009 | Nashiki et al. | |
| 2011/0128240 A1* | 6/2011 | Choi .................. G02F 1/13 345/173 | |
| 2011/0141059 A1 | 6/2011 | Nashiki | |
| 2012/0050225 A1* | 3/2012 | Chou ............... G06F 3/041 345/175 | |
| 2012/0075269 A1 | 3/2012 | Xu | |
| 2012/0154725 A1 | 6/2012 | Jeon et al. | |
| 2012/0242565 A1 | 9/2012 | Noh | |
| 2013/0088453 A1* | 4/2013 | Park ............... G06F 1/1643 345/173 | |
| 2013/0209773 A1 | 8/2013 | Endo et al. | |
| 2013/0241857 A1* | 9/2013 | Chung ............... G06F 3/044 345/173 | |
| 2014/0028584 A1 | 1/2014 | Park et al. | |
| 2014/0132861 A1 | 5/2014 | Wang et al. | |
| 2014/0204043 A1 | 7/2014 | Lin et al. | |
| 2014/0363956 A1 | 12/2014 | Hatakeyama | |
| 2014/0367242 A1* | 12/2014 | Chen ............... H03K 17/9622 200/600 | |
| 2015/0103271 A1* | 4/2015 | Lee .................. G06F 3/044 349/12 | |
| 2015/0346872 A1 | 12/2015 | Hwang et al. | |

FOREIGN PATENT DOCUMENTS

| | | |
|---|---|---|
| JP | 2010-211790 | 9/2010 |
| KR | 10-2013-0135834 | 12/2013 |
| KR | 10-2014-0063377 | 5/2014 |
| KR | 10-2014-0071026 | 6/2014 |
| KR | 10-1403543 | 6/2014 |
| KR | 10-1413637 | 7/2014 |
| TW | M455209 | 6/2013 |
| TW | 201427824 | 7/2014 |

OTHER PUBLICATIONS

Taiwanese Office Action dated Nov. 9, 2016 issued in Application No. 104105522 (English translation attached).

European Office Action dated Jul. 12, 2016 issued in Application No. 15155429.2.

European Search Report dated Jul. 2, 2015 issued in Application No. 15155429.2.

Korean Office Action dated Mar. 30, 2015 issued in Application No. 10-2014-0132473.

U.S. Office Action dated Jul. 27, 2017 issued in co-pending U.S. Appl. No. 14/625,082.

U.S. Final Office Action dated Mar. 21, 2017 issued in co-pending U.S. Appl. No. 14/625,082.

U.S. Office Action dated Oct. 28, 2016 issued in co-pending U.S. Appl. No. 14/625,082.

\* cited by examiner

TOUCH PANEL

CROSS-REFERENCE TO RELATED APPLICATIONS

This application is a Continuation of U.S. patent application Ser. No. 14/625,082 filed on Feb. 18, 2015, which claims priority under 35 U.S.C. § 119 to Korean Application Nos. 10-2014-0097155 filed on Jul. 30, 2014, 10-2014-0130024 filed on Sep. 29, 2014, 10-2014-0132473 filed on Oct. 1, 2014 and 10-2015-0008838 filed on Jan. 19, 2015, whose entire disclosures are incorporated herein by reference.

BACKGROUND

1. Field

The embodiment relates to a touch panel.

2. Background

Recently, a touch panel, which performs an input function through the touch of an image displayed on a display device by an input device, such as a stylus pen or a finger, has been applied to various electronic appliances.

Such a touch panel may be mainly classified into a resistive touch panel and a capacitive touch panel. In the resistive touch panel, glass is shorted with an electrode due to the pressure of the input device so that a touch point is detected. In the capacitive touch panel, the position of the touch point is detected by detecting the variation in capacitance between electrodes when a finger of the user touches the capacitive touch panel.

The performance of the resistive touch panel may be degraded and the scratch may occur as the resistive touch panel is repeatedly used. Accordingly, the interest on the capacitive touch panel representing superior endurance and a long lifespan is increased.

Such a touch panel may have various types according to the position of the electrode. For instance, the electrode may be formed only on one surface of a cover substrate or may be formed on the one surface of the cover substrate and one surface of a substrate.

When the electrode is disposed on the cover substrate, the strength of the cover substrate may be lowered in the process of forming the electrode. In this case, the overall strength of the touch window may be lowered, thereby deteriorating the reliability.

Therefore, a touch panel having a novel structure capable of solving the above problem is required.

BRIEF DESCRIPTION OF THE DRAWINGS

The embodiments will be described in detail with reference to the following drawings in which like reference numerals refer to like elements wherein.

DETAILED DESCRIPTION

Figure 1:
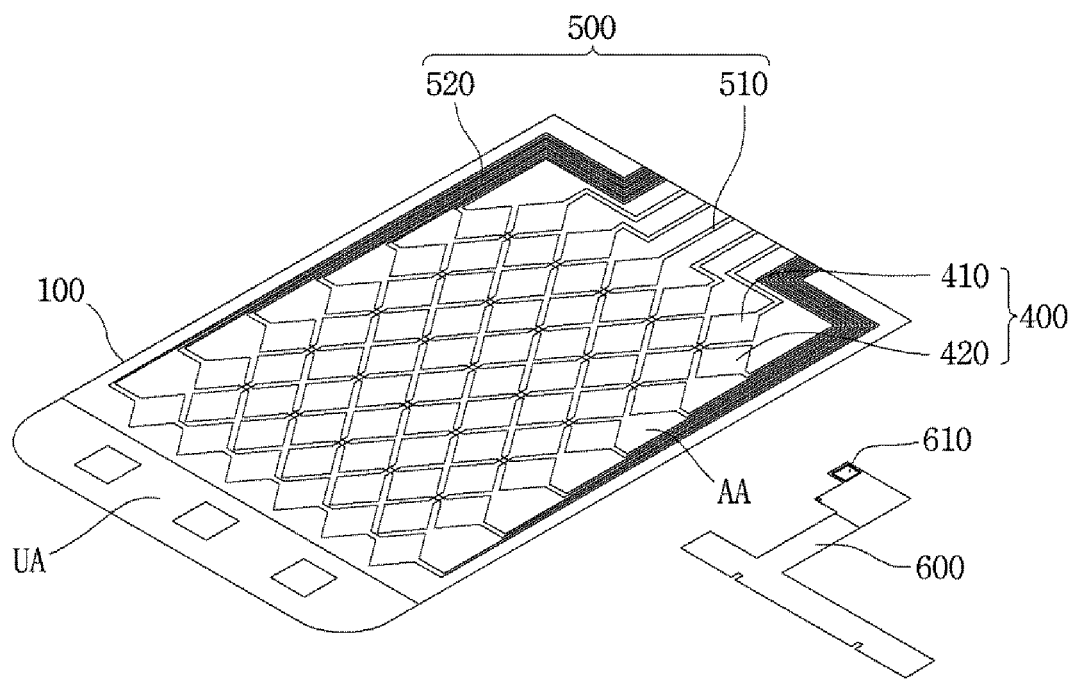
FIG. 1 is an exploded perspective view showing a touch panel according to first and second embodiments.
Figure 2:
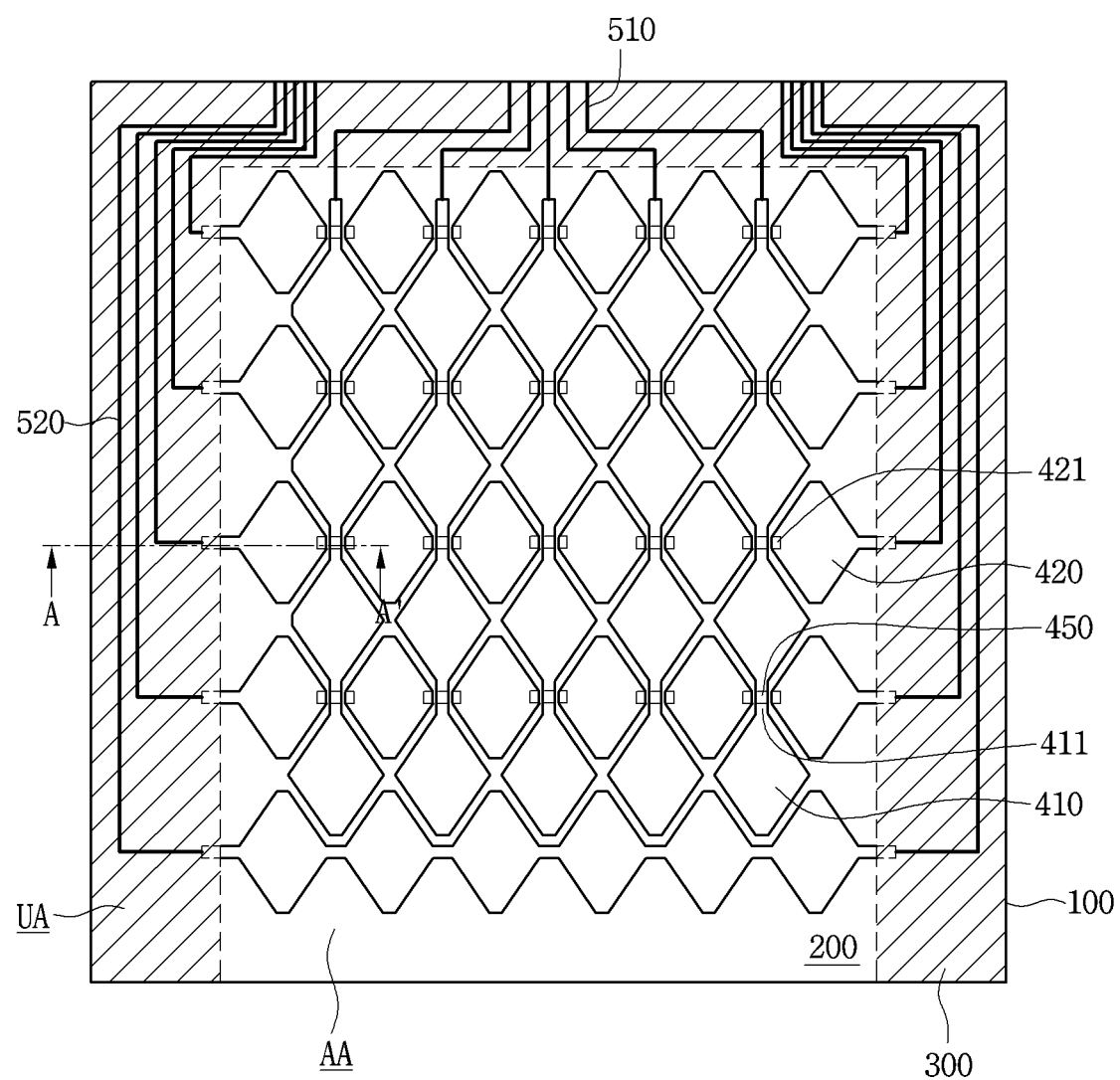
FIG. 2 is a plane view showing a touch panel according to first and second embodiments.

In the following description of the embodiments, it will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer described with reference to the drawings.

The thickness and size of each layer (film), region, pattern or structure shown in the drawings may be modified, so the size of elements shown in the drawings does not utterly reflect an actual size.

Hereinafter, the embodiment will be described with reference to accompanying drawings.

FIGS. 1 to 12 are views to explain the first and second embodiments.

Referring to FIGS. 1 to 6, a touch panel 10 according to the first embodiment may include a cover substrate 100, an intermediate layer 200, a printing layer 300, a sensing electrode 400, a wire electrode 500, and a printed circuit board 600.

The cover substrate 100 may support the intermediate layer 200, the printing layer 300, the sensing electrode 400, and the wire electrode 500. That is, the cover substrate 100 may be a support substrate.

The cover substrate 100 may be rigid or flexible.

For example, the cover substrate 100 may include glass or plastic. In detail, the cover substrate 100 may include chemically tempered/semi-tempered glass, such as soda lime glass or aluminosilicate glass, reinforced or flexible plastic, such as polyimide (PI), polyethylene terephthalate (PET), propylene glycol (PPG) or polycarbonate (PC), or sapphire.

In addition, the substrate cover 100 may include an optical isotropic film. For example, the substrate 100 may include cyclic olefin copolymer (COC), cyclic olefin polymer (COP), optical isotropic polycarbonate (PC), or optical isotropic polymethyl methacrylate (PMMA).

The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance.

In addition, the cover substrate 100 may have a curved portion to be bent. That is, the cover substrate 100 may be bent to have a partial flat surface and a partial curved surface. In detail, an end of the cover substrate 100 may be bent to have a curved surface or may be bent or flexed to have a surface including a random curvature.

Further, the cover substrate 100 may include a flexible substrate having a flexible property.

In addition, the cover substrate 100 may be a curved substrate or a bended substrate. That is, the touch window having the substrate may be formed to have a flexible, curved or bended property. For this reason, the touch window according to the embodiment may be easily portable and may be variously changed in design.

The cover substrate 100 may have an active area AA and an unactive area UA defined therein.

An image may be displayed in the active area AA. The image is not displayed in the unactive area UA provided at a peripheral portion of the active area AA.

In addition, the position of an input device (e.g., finger) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point.

Referring to FIGS. 2 to 6, the intermediate layer 200 may be disposed on the cover substrate 100. In detail, the intermediate layer 200 may be disposed on at least one of the active area AA and the unactive area UA of the cover substrate 100.

Although not shown in FIGS. 2 to 6, an adhesive layer may be further disposed between the cover substrate 100 and the intermediate layer 200. In other words, the intermediate layer 200 may directly make contact with the cover substrate 100 or indirectly make contact with the cover substrate 100 by interposing the adhesive layer, such as an optically clear adhesive layer, between the cover substrate 100 and the intermediate layer 200.

Figure 3:
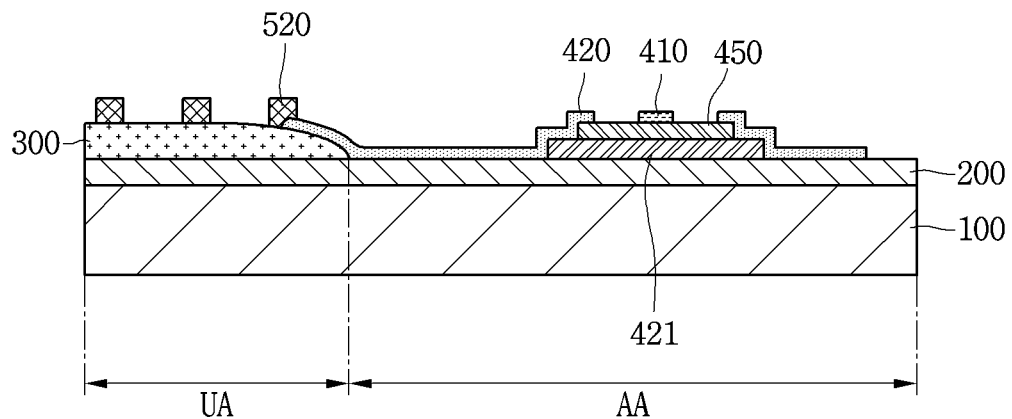
FIGS. 3 to 6 are sectional views of the touch panel according to the first embodiment, which are taken along line A-A' of FIG. 2.
Figure 4:
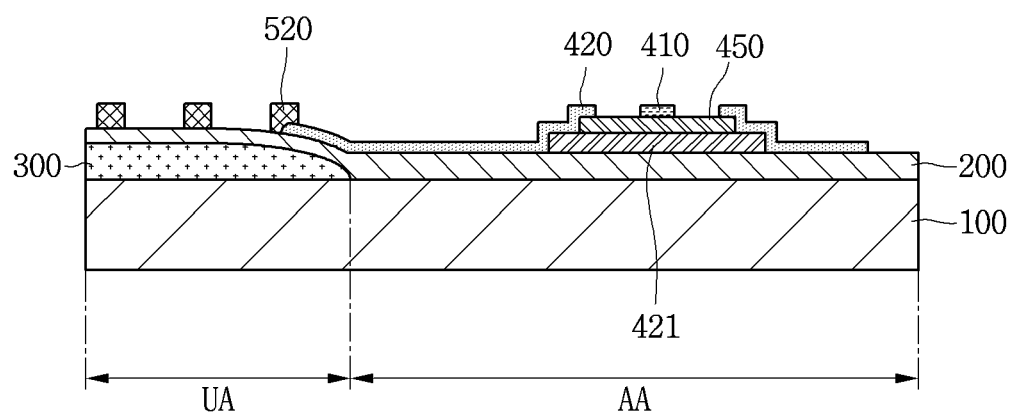

In detail, referring to FIGS. 3 and 4, the intermediate layer 200 may be disposed on the active area AA and the unactive area UA of the cover substrate 100. In addition, referring to FIG. 6, the intermediate layer 200 may be disposed only on the active area AA of the cover substrate 100.

The intermediate layer 200 may be disposed on a top surface and a lateral side of the cover substrate 100. For example, referring to FIG. 5, the intermediate layer 200 may entirely or partially make contact with the top surface and the lateral side of the cover substrate 100. The intermediate layer 200 may make contact with at least one of both sides of the cover substrate 100. Although FIG. 4 shows the intermediate layer 200 disposed at one lateral side of the cover substrate 100, the embodiment may not be limited thereto. The intermediate layer 200 may be disposed on all lateral sides of the cover substrate 100.

In addition, the intermediate layer 200 may completely or partially surround the lateral sides of the cover substrate 100.

The intermediate layer 200 may include a resin composition. The resin composition may include at least one of organic substance and inorganic substance. For instance, the resin composition may include organic substance. In detail, the intermediate layer 200 may include acrylic organic substance.

The resin composition may include acrylic copolymer, cross-linking agent, photo initiator, additive, DE acetate (Diethylene Glycol Monoethyl Ether Acetate), and MEDG (Diethylene Glycol Methyl Ethyl Ether).

In detail, in order to improve the strength of the cover substrate 100 and reinforce the adhesive force between the cover substrate 100 and the intermediate layer 200, the resin composition may include about 15 wt % to about 25 wt % of acrylic copolymer, about 10 wt % to about 20 wt % of cross-linking agent, about 1 wt % to about 3 wt % of photo initiator, about 4 wt % to about 6 wt % of additive, about 5 wt % to about 15 wt % of DE acetate and about 30 wt % to about 70 wt % of MEDG.

In addition, the resin composition may include both of organic substance and inorganic substance.

For instance, the intermediate layer 200 may include the organic substance including acrylate and the inorganic substance including zirconia. A solid matter including the acrylate and zirconia is mixed with a solvent, such as alcohol, to prepare the resin composition.

The intermediate layer 200 including the resin composition is coated and cured on the cover substrate 100 to form a resin layer.

The intermediate layer 200 may reinforce the strength of the cover substrate 100. In detail, the intermediate layer 200 may be disposed between the cover substrate 100 and the sensing electrode 400 and/or the wire electrode 500, which is formed on the cover substrate 100, and prevent the strength degradation of the cover substrate 100 in the process of forming the sensing electrode 400 and/or the wire electrode 500.

The intermediate layer 200 may have a thickness of about 2 μm. In detail, the intermediate layer 200 may have a thickness in the range of about 2 μm. to about 3 μm. In more detail, the intermediate layer 200 may have a thickness in the range of about 2 μm. to about 2.5 μm. If the intermediate layer 200 has a thickness less than about 2 μm, the strength of the cover substrate may be lowered in the process of forming an electrode. If the intermediate layer 200 has a thickness more than about 2.5 μm, the transmittance of the touch panel may be lowered due to the intermediate layer 200.

In addition, the intermediate layer 200 may have the transmittance of about 89% or above. If the intermediate layer 200 has the transmittance less than about 89%, the intermediate layer 200 or the electrode may be viewed from the outside so that the visibility of the touch panel may be deteriorated.

Figure 5:
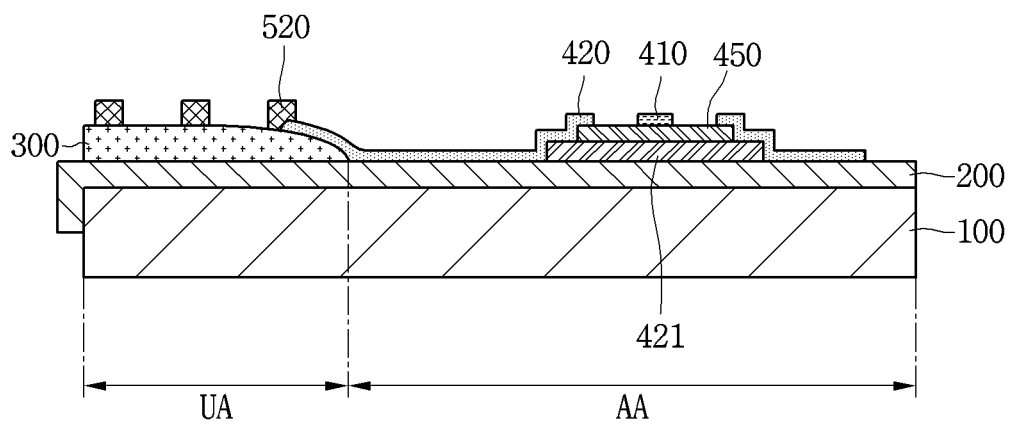

The printing layer 300 may be disposed on the unactive area of the cover substrate 100. The printing layer 300 may be disposed on one surface of the cover substrate 100 or one surface of the intermediate layer 200 formed on the cover substrate 100. Although FIGS. 3 to 5 show the printing layer formed as a single layer, the embodiment is not limited thereto. The printing layer may be formed as at least two layers. If the printing layer is formed as at least two layers, the layers may have mutually different widths.

Referring to FIGS. 3 and 5, the printing layer 300 may be disposed on the intermediate layer 200. For instance, the printing layer 300 may be disposed on the intermediate layer 200 corresponding to the unactive area of the cover substrate 100.

In addition, referring to FIG. 4, the intermediate layer 200 may be disposed on the active area and the unactive area of the cover substrate 1'00. For instance, the printing layer 300 may be disposed on the unactive area, and the intermediate layer 200 may make contact with a lateral side and a top surface of the printing layer 300. That is, the intermediate layer 200 may surround the printing layer 300.

In addition, the wire electrode, for example, the second wire electrode 520 may make contact with the intermediate layer 200. In detail, the printing layer 300, the intermediate layer 200 and the wire electrode may be sequentially disposed on the unactive area of the cover substrate 100.

Therefore, the wire electrode 520 may be disposed on a surface of the intermediate layer other than on a surface of the printing layer. Thus, the wire electrode can be prevented from being damaged by the high roughness of the printing layer. In addition, a step difference between the sensing electrode and the wire electrode may be attenuated due to the intermediate layer, so that crack may not occur at the connection part between the sensing electrode and the wire electrode. The wire electrode 520 may be disposed on the surface of the printing layer to reduce the total thickness of the touch panel.

Figure 6:
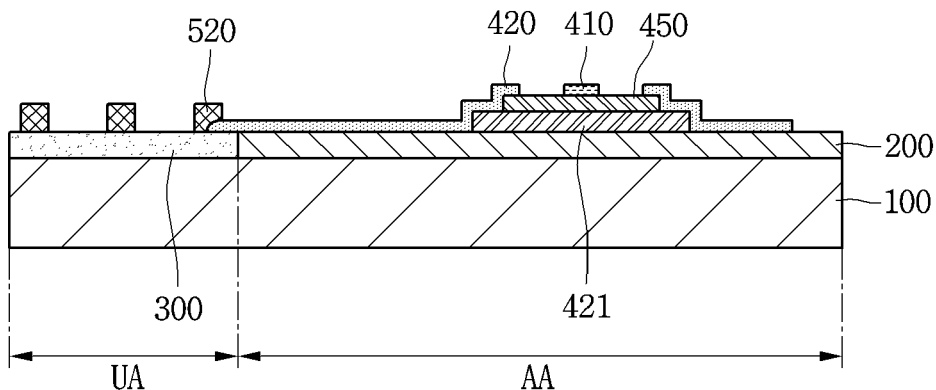

Referring to FIG. 6, the printing layer 300 may be disposed on one surface of the cover substrate 100. For example, the printing layer 300 may be disposed on the unactive area of the cover substrate 100 and the intermediate layer 200 may be disposed on the active area of the cover substrate 100. That is, the intermediate layer 200 and the printing layer 300 may be disposed on the same plane of the cover substrate 100.

Accordingly, the step difference caused by the printing layer may be removed by the intermediate layer, so the crack or damage to the electrode caused by the step difference of the printing layer can be prevented.

The printing layer 300 may have various colors in match with the desired outer appearance. In detail, the printing layer 300 may have various colors of black, white, blue and red.

The printing layer 300 may prevent the wire electrode or the printed circuit board formed on the cover substrate 100 from being viewed from the outside.

The sensing electrode 400 may be disposed on the cover substrate 100. For example, the sensing electrode 400 may be disposed on the intermediate layer 200 formed on the cover substrate 100. In detail, the sensing electrode 400 may be disposed on the active area AA of the cover substrate 100. In more detail, the sensing electrode 400 may extend toward the unactive area UA from the active area AA of the cover substrate 100.

The sensing electrode 400 may include a conductive material. For instance, the sensing electrode 400 may include a transparent conductive material which allows electricity to flow therethrough without interfering with light transmission. For instance, the sensing electrode 400 may include metal oxide, such as indium tin oxide, indium zinc oxide, copper oxide, tin oxide, zinc oxide, or titanium oxide.

However, the embodiment is not limited to the above. The sensing electrode 400 may include a nanowire, a photosensitive nanowire film, carbon nanotube (CNT), graphene, conductive polymer or a mixture thereof.

In addition, the sensing electrode 400 may include various metals. For instance, the sensing electrode 400 may include at least one of Cr, Ni, Cu, Al, Ag, Mo, Au, Ti and an alloy thereof.

The sensing electrode 400 may include a first sensing electrode 410 and a second sensing electrode 420.

The first sensing electrode 410 may extend in the first direction on the unactive area UA of the cover substrate 100. In detail, the first sensing electrode 410 may be disposed on the intermediate layer 200 formed on the cover substrate 100. One surface of the intermediate layer 200 may come into contact with one surface of the cover substrate 100, and the first sensing electrode 410 may come into contact with the other surface of the intermediate layer 200 which is opposite to the one surface.

In addition, the second sensing electrode 420 may extend in the second direction on the active area UA of the cover substrate 100. In detail, the second sensing electrode 420 may be disposed on the intermediate layer 200 formed on the cover substrate 100 while extending in the second direction different from the first direction. For example, the second sensing electrode 420 may come into contact with the other surface of the intermediate layer 200. That is, the first and second sensing electrodes 410 and 420 may be disposed on the same plane of the intermediate layer 200 formed on the cover substrate 100 while making contact with the intermediate layer and extending in mutually different directions.

The first and second sensing electrodes 410 and 420 may be insulated from each other on the intermediate layer 200 formed on the cover substrate 100. In detail, the first sensing electrodes 410 may be connected to each other by first connection electrodes 411, an insulating layer 450 may be disposed on a part of the first connection electrodes 411 and second connection electrodes 421 may be disposed on the insulating layer 450 to connect the second sensing electrodes 420 to each other.

Therefore, the first and second sensing electrodes 410 and 420 may not make contact with each other and may be disposed together while being insulated from each other on the same plane of the intermediate layer 200 formed on the cover substrate 100, that is, the active area.

The wire electrode 500 may be disposed on the unactive area UA of the cover substrate 100. In detail, the wire electrode 500 may be disposed on the printing layer 300. The wire electrode 500 is connected to the sensing electrode 400 on the printing layer 300.

For example, as shown in FIG. 3 or 5, the wire electrode 500 may be disposed on the printing layer 300 formed on the intermediate layer 200. Otherwise, as shown in FIG. 4, the wire electrode 500 may be disposed on the intermediate layer 200 formed on the printing layer 300. In addition, as shown in FIG. 6, the wire electrode 500 may be disposed on the printing layer 300 formed on the cover substrate 100.

The wire electrode 500 may include a first wire electrode 510 and a second wire electrode 520. In detail, the wire electrode 500 may include the first wire electrode 510 connected to the first sensing electrode 410 and the second wire electrode 520 connected to the second sensing electrode 420. One end of the first wire electrode 510 and the second wire electrode 520 may be connected to the sensing electrode 400 and the other end of the first wire electrode 510 and the second wire electrode 520 may be connected to the printed circuit board 600.

The wire electrode 500 may include a conductive material. For instance, the wire electrode 500 may include a metallic material, such as Cu or Ag, but the embodiment is not limited thereto. For instance, the wire electrode 500 may include a transparent conductive material, such as indium tin oxide.

The wire electrode 500 may receive a touch signal from the sensing electrode 400 and transfer the touch signal to a driving chip 610 mounted on the printed circuit board 600 electrically connected to the wire electrode 500.

The printed circuit board 600 may be a flexible printed circuit board (FPCB). The printed circuit board 600 may be connected to the wire electrode 500 disposed on the unactive area UA. In detail, the printed circuit board 600 may be electrically connected to the wire electrode 500 on the unactive area UA through an anisotropic conducting film (AFC).

The driving chip 610 may be mounted on the printed circuit board 600. In detail, the driving chip 610 may receive the touch signal, which is sensed by the sensing electrode 400, from the wire electrode 500 to perform the operation based on the touch signal.

Hereinafter, a touch panel according to the second embodiment will be described in detail with reference to FIGS. 7 to 12. In the following description of the touch panel according to the second embodiment, description about elements and structures the same as or similar to those of the touch panel according to the first embodiment will be omitted. In addition, the same reference numerals will be assigned to the elements the same as those of the first embodiment.

Figure 7:
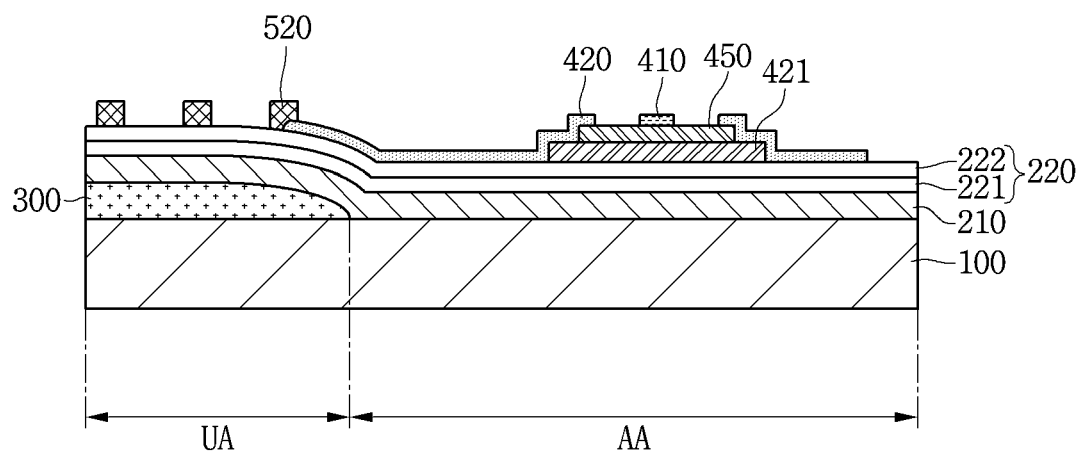
FIGS. 7 to 12 are sectional views of the touch panel according to the second embodiment, which are taken along line A-A' of FIG. 2.
Figure 8:
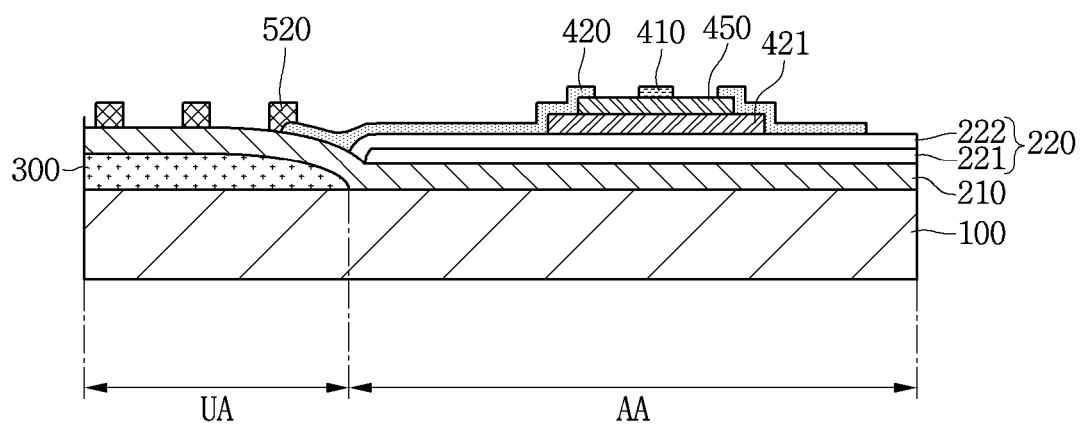
Figure 9:
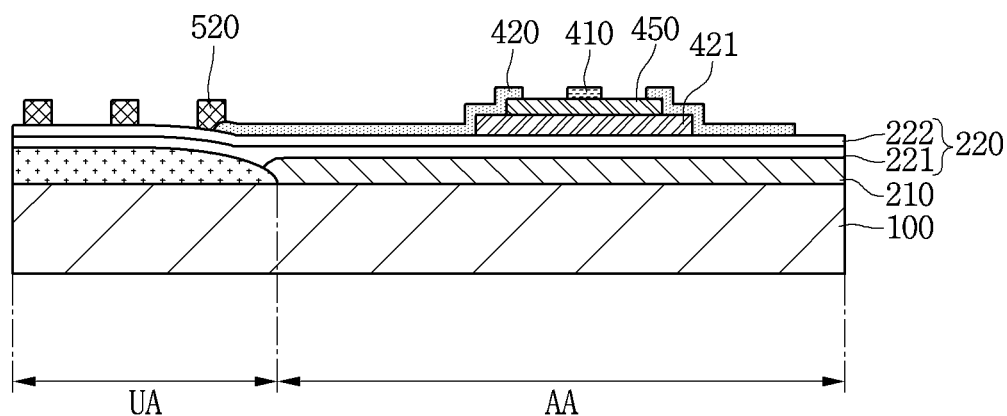

Referring to FIGS. 7 to 9, the touch panel according to the second embodiment may include a first intermediate layer 210 and a second intermediate layer 220.

For example, the touch panel according to the second embodiment may include a cover substrate 100, the first intermediate layer 210 formed on the cover substrate 100, and a sensing electrode and/or a wire electrode formed on the first intermediate layer 210. The second intermediate layer 220 may be disposed between the first intermediate layer 210 and the electrode.

The first intermediate layer 210 may be disposed on the cover substrate 100. For example, the first intermediate layer 210 may be disposed on at least one of the active area AA and the unactive area UA of the cover substrate 100. For instance, the first intermediate layer 210 may be disposed only on the active area AA of the cover substrate 100 as shown in FIG. 9, or the first intermediate layer 210 may be disposed on both of the active area AA and the unactive area UA as shown in FIGS. 7 and 8. When the first intermediate layer 210 is disposed on both of the active area AA and the unactive area UA as shown in FIGS. 7 and 8, the first intermediate layer 210 may be disposed on the printing layer 300 formed on the unactive area UA.

The thickness, composition and transmittance of the first intermediate layer 210 may be identical or similar to those of the intermediate layer 200 according to the first embodiment, so detailed description thereof will be omitted.

The second intermediate layer 220 may be disposed on the first intermediate layer 210. The second intermediate layer 220 may be disposed between the first intermediate layer 210 and the electrode. The second intermediate layer 220 may come into contact with the first intermediate layer 210. For instance, the second intermediate layer 220 may directly come into contact with the first intermediate layer 210. In addition, another layer may be interposed between the second intermediate layer 220 and the first intermediate layer 210.

The second intermediate layer 220 may include at least two layers. For example, the second intermediate layer 220 may include a first sub-second intermediate layer 221 and a second sub-second intermediate layer 222. In detail, the second intermediate layer 220 may include the first sub-second intermediate layer 221 formed on the first intermediate layer 210 and the second sub-third intermediate layer 222 formed on the first sub-second intermediate layer 221.

The first sub-second intermediate layer 221 may have a refractive index different from that of the second sub-second intermediate layer 222. For example, the first sub-second intermediate layer 221 may have a refractive index higher than that of the second sub-second intermediate layer 222.

That is, the first sub-second intermediate layer 221 may be a high refractive layer and the second sub-second intermediate layer 222 may be a low refractive layer.

In addition, the first sub-second intermediate layer 221 and the second sub-second intermediate layer 222 may have the same or similar thickness.

Since the second intermediate layer 220 is disposed between the cover substrate 100 and the electrode and includes the high refractive layer and the low refractive layer, the electrode can be prevented from being viewed from the outside due to the difference in refractive index between the cover substrate 100 and the electrode. For example, the second intermediate layer 220 may be an index matching layer to compensate for the difference in refractive index between the cover substrate 100 and the electrode.

The second intermediate layer 220 may be disposed on at least one of the active area and unactive area of the cover substrate 100. For instance, the second intermediate layer 220 may be disposed only on the active area AA of the cover substrate 100 as shown in FIG. 8, or the second intermediate layer 220 may be disposed on both of the active area AA and the unactive area UA as shown in FIGS. 7 and 9.

The electrode, that is, the sensing electrode and the wire electrode may be disposed on the surface of the second intermediate layer 220. For example, the sensing electrode and the wire electrode may directly come into contact with the second intermediate layer 220.

Figure 10:
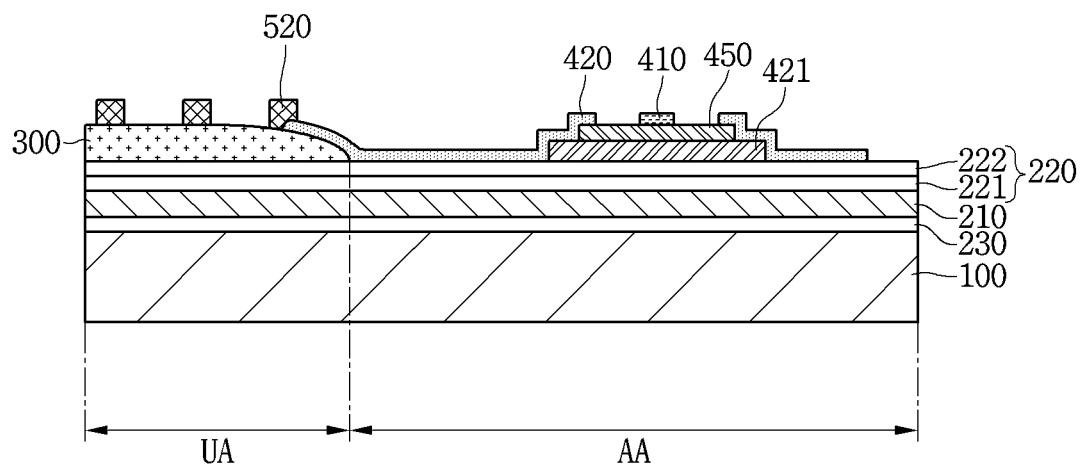

For example, the printing layer and the first intermediate layer may be disposed on the unactive area of the cover substrate 100 as shown in FIG. 8, the printing layer and the second intermediate layer may be disposed on the unactive area of the cover substrate 100 as shown in FIG. 9, or the printing layer, the first intermediate layer and the second intermediate layer may be disposed on the unactive area of the cover substrate 100 as shown in FIG. 10.

The first sensing electrode 410 and the second sensing electrode 20 may be disposed on the surface of the second intermediate layer 220.

In addition, the first wire electrode 510 and the second wire electrode 520, which transfer signals to the sensing electrodes, may be disposed on the printing layer 300. In detail, at least one of the first intermediate layer and the second intermediate layer 220 may be interposed between the printing layer and the wire electrode.

For example, referring to FIG. 7, the first intermediate layer 210 and the second intermediate layer 220 may be interposed between the printing layer 300 and the second wire electrode 520. That is, the second wire electrode 520 may be disposed on the surface of the second intermediate layer 220.

In addition, referring to FIG. 8, the first intermediate layer 210 may be interposed between the printing layer 300 and the second wire electrode 520. That is, the second wire electrode 520 may be disposed on the surface of the first intermediate layer 210.

Further, referring to FIG. 9, the second intermediate layer 220 may be interposed between the printing layer 300 and the second wire electrode 520. That is, the second wire electrode 520 may be disposed on the surface of the second intermediate layer 220.

Although FIGS. 7 to 9 show the second intermediate layer disposed under the electrode, that is, between the electrode and the first intermediate layer, the embodiment is not limited thereto. The second intermediate layer may be disposed on the electrode. That is, the second intermediate layer may be disposed on the electrode without making contact with the first intermediate layer.

Figure 11:
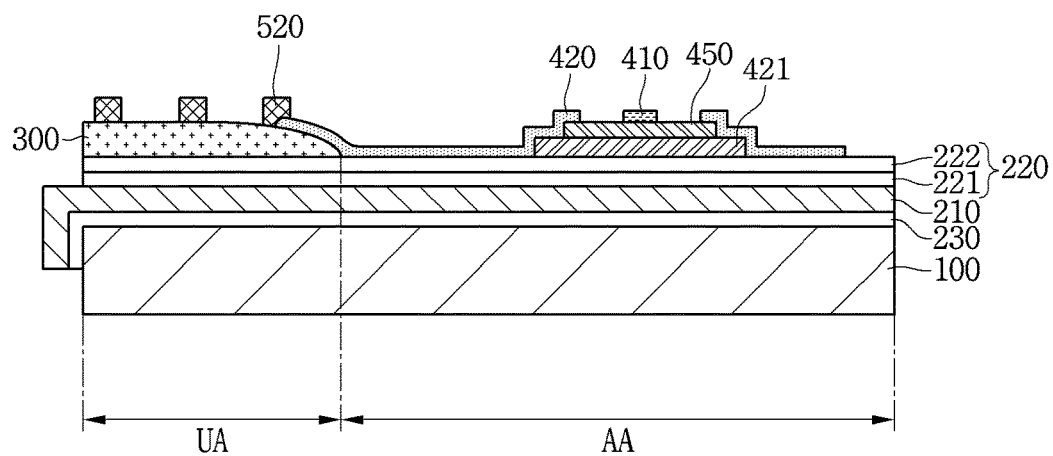
Figure 12:
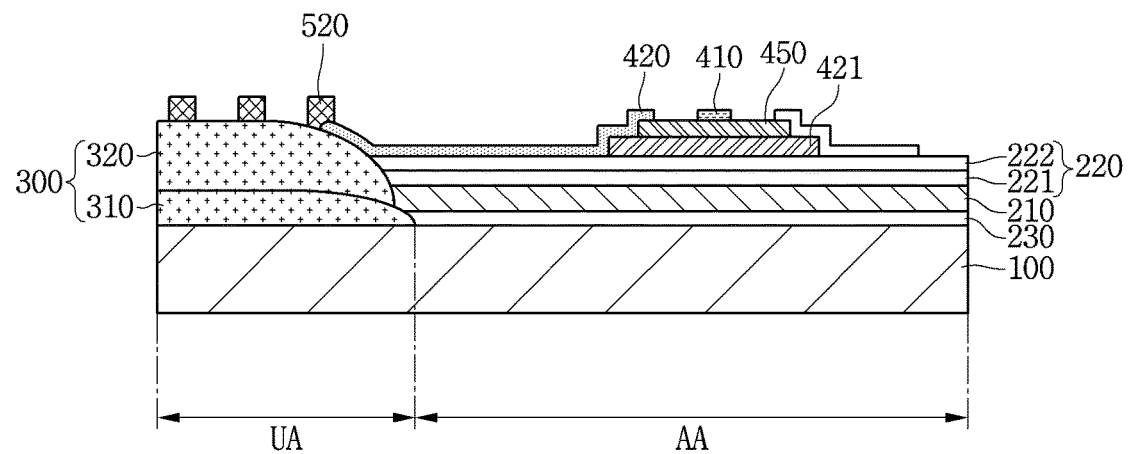
Figure 13:
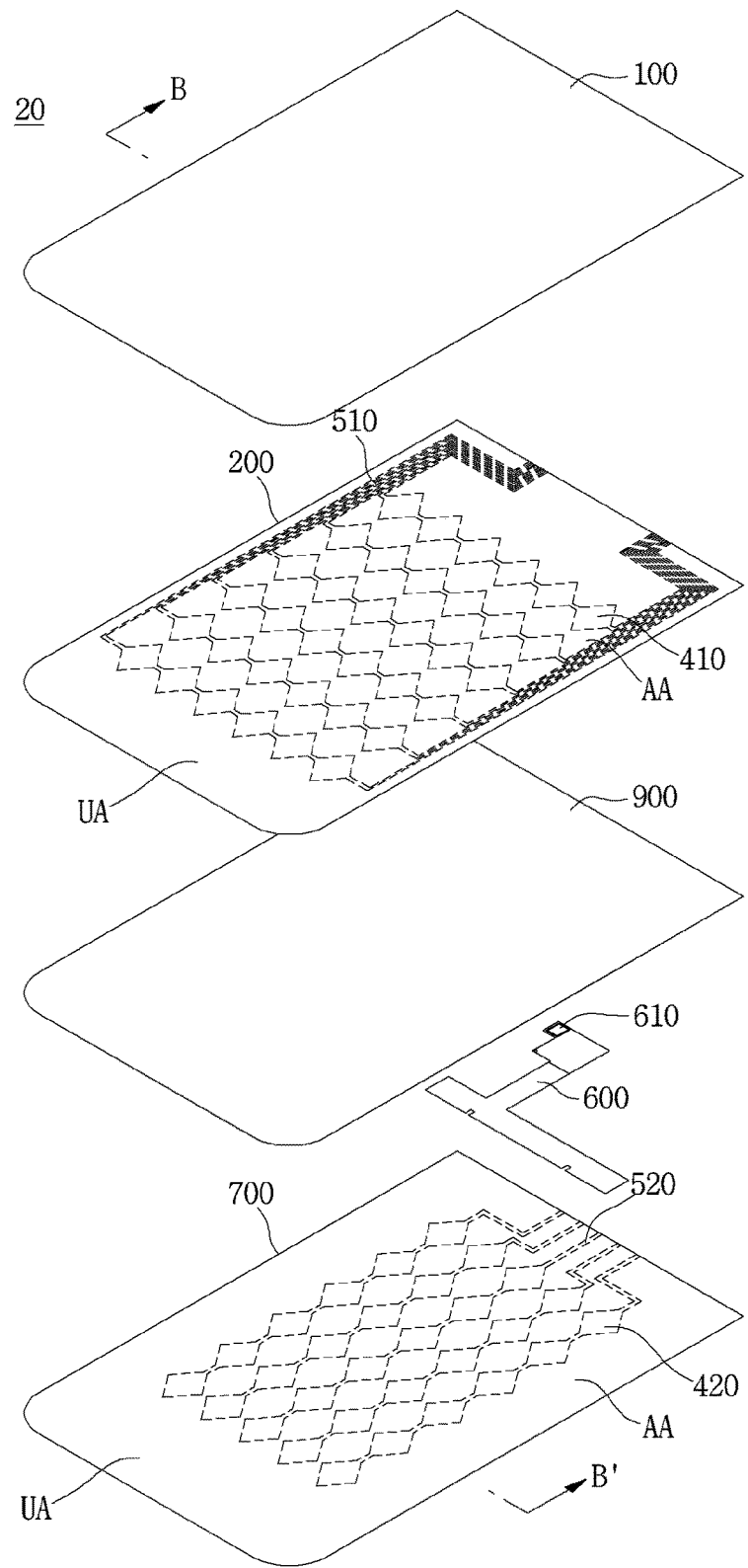
FIG. 13 is a perspective view showing a touch panel according to third and fourth embodiments.

Referring to FIGS. 10 to 12, the touch panel according to the second embodiment may further include a third intermediate layer 230.

The third intermediate layer 230 may be disposed on the cover substrate 100. For example, the third intermediate layer 230 may be disposed between the cover substrate 100 and the first intermediate layer 210.

The third intermediate layer 230 may come into contact with the cover substrate 100. For example, the third intermediate layer 230 may directly come into contact with the cover substrate 100. Otherwise, the third intermediate layer 230 may indirectly come into contact with the cover substrate 100.

The third intermediate layer 230 may include inorganic substance. For example, the third intermediate layer 230 may include the inorganic substance, such as $SiO_2$. That is, at least one of the first and third intermediate layers 210 and 230 may include the inorganic substance.

The third intermediate layer 230 may be thinner than the first intermediate layer 210. For example, the third intermediate layer 230 may have a thickness of several nanometers (nm). For example, the third intermediate layer 230 may have a thickness of 1 nm or above. In detail, the third intermediate layer 230 may have a thickness in the range of 1 nm to 20 nm. In more detail, the third intermediate layer 230 may have a thickness in the range of 1 nm to 10 nm.

If the third intermediate layer 230 has a thickness less than 1 nm, an adhesive force of the first intermediate layer 210 formed on the third intermediate layer 230 may be lowered so that the first intermediate layer 210 may be delaminated, thereby deteriorating the reliability of the touch panel. In addition, if the third intermediate layer 230 has a thickness more than 20 nm, an overall thickness of the touch panel may be increased.

At least one of the first intermediate layer 210, the second intermediate layer 220 and the third intermediate layer 230 may be disposed on at least one of the active area AA and the unactive area UA of the cover substrate 100.

For example, referring to FIG. 10, at least one of the first intermediate layer 210, the second intermediate layer 220 and the third intermediate layer 230 may be disposed on the active area AA and the unactive area UA of the cover substrate 100.

In addition, referring to FIG. 11, at least one of the first intermediate layer 210, the second intermediate layer 220 and the third intermediate layer 230 may be disposed on a lateral side of the cover substrate 100 as well as on the active area AA and the unactive area UA of the cover substrate 100. Although FIG. 11 shows the intermediate layer(s) disposed on one lateral side of the cover substrate, the embodiment is not limited thereto. The intermediate layer(s) may be disposed on all lateral sides of the cover substrate.

In addition, the intermediate layer(s) may completely or partially surround the lateral side of the cover substrate.

In addition, referring to FIG. 12, at least one of the first intermediate layer 210, the second intermediate layer 220 and the third intermediate layer 230 may be disposed only on the active area AA of the cover substrate 100. For example, the first intermediate layer 210, the second intermediate layer 220 and the third intermediate layer 230 may be disposed only on the active area AA of the cover substrate 100 and the printing layer including a first printing layer 310 and a second printing layer 320 may be disposed on the unactive area UA. In addition, one surface of the third intermediate layer 220 may be aligned on the same or similar plane with one surface of the printing layer 300. Thus, the step difference caused by the printing layer may be removed by the intermediate layers, so the crack or damage to the electrode caused by the step difference of the printing layer can be prevented.

FIGS. 13 to 20 are views to explain the third and fourth embodiments.

Hereinafter, a touch panel according to the third embodiment will be described with reference to FIGS. 13 to 17. In the description of the touch panel according to the third embodiment, details of the structures and the elements the same as those of the first embodiment will be omitted, and the same reference numerals will be assigned to the same elements.

Referring to FIGS. 13 to 17, the touch panel 20 according to the third embodiment may further include a substrate 700 formed on the cover substrate 100. The cover substrate 100 and the substrate 700 may be bonded to each other by an adhesive layer 900 interposed between the cover substrate 100 and the substrate 700. The adhesive layer 900 may be transparent. For example, the adhesive layer 900 may include an optically clear adhesive layer.

The above-described intermediate layer 200 may be disposed on the cover substrate 100. In detail, the intermediate layer 200 may be disposed between the cover substrate 100 and the substrate 700.

Figure 14:
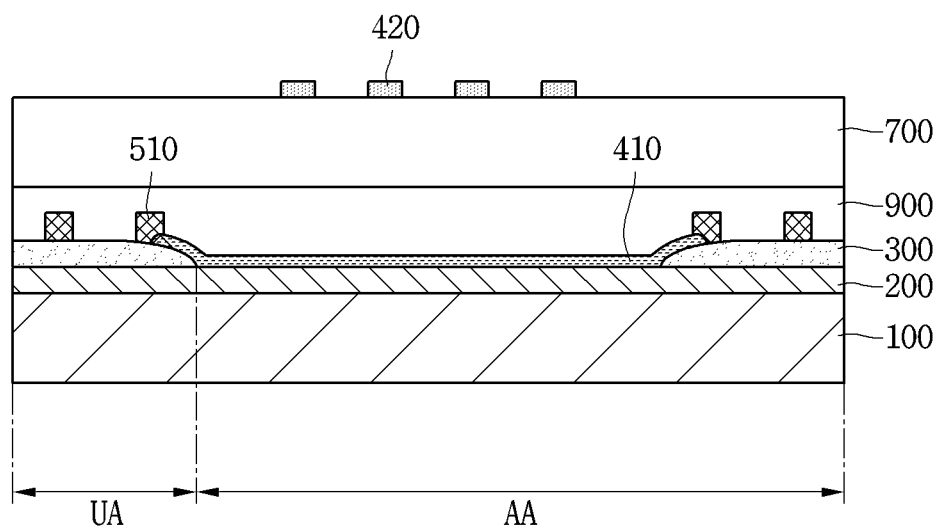
FIGS. 14 to 17 are sectional views of the touch panel according to the third embodiment, which are taken along line B-B' of FIG. 13.

Referring to FIG. 14, the intermediate layer may be disposed on the cover substrate 100. In detail, one surface of the intermediate layer 200 may directly make contact with the cover substrate 100.

The printing layer 300, the sensing electrode and the wire electrode may be disposed on the other surface of the intermediate layer 200. In detail, the printing layer 300 may be disposed on the intermediate layer 200 corresponding to the unactive area of the cover substrate 100. In addition, the first sensing electrode 410 may be disposed on the intermediate layer 200 corresponding to the active area of the cover substrate 100. The first sensing electrode 410 may be connected to the first wire electrode 510 formed on the printing layer 300.

The substrate 700 may be formed on the intermediate layer 200 and the second sensing electrode 420 and the second wire electrode may be disposed on the substrate 700. The substrate 700 may be bonded to the intermediate layer 200 by optically clear adhesive (OCA).

Figure 15:
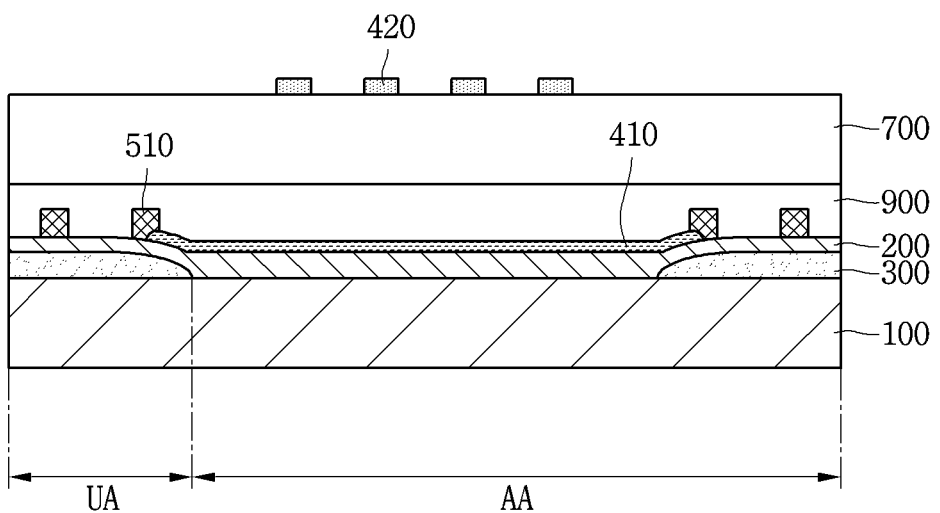

Referring to FIG. 15, the intermediate layer 200 may be disposed on the cover substrate 100. For example, the printing layer 300 may be disposed on the unactive area UA of the cover substrate 100 and the intermediate layer 200 may be disposed on the printing layer 300.

The intermediate layer 200 may come into contact with the lateral side and the top surface of the printing layer 300. That is, the intermediate layer 200 may surround the printing layer 300.

In addition, the wire electrode, for example, the first wire electrode 510 may come into contact with the intermediate layer 200. In detail, the printing layer 300, the intermediate layer 200 and the wire electrode may be sequentially disposed on the unactive area of the cover substrate 100.

Therefore, the wire electrode may be disposed on the intermediate layer other than the printing layer. Thus, the wire electrode can be prevented from being damaged by the high roughness of the printing layer. In addition, a step difference between the sensing electrode and the wire electrode may be attenuated due to the intermediate layer, so that crack may not occur at the connection part between the sensing electrode and the wire electrode.

Figure 16:
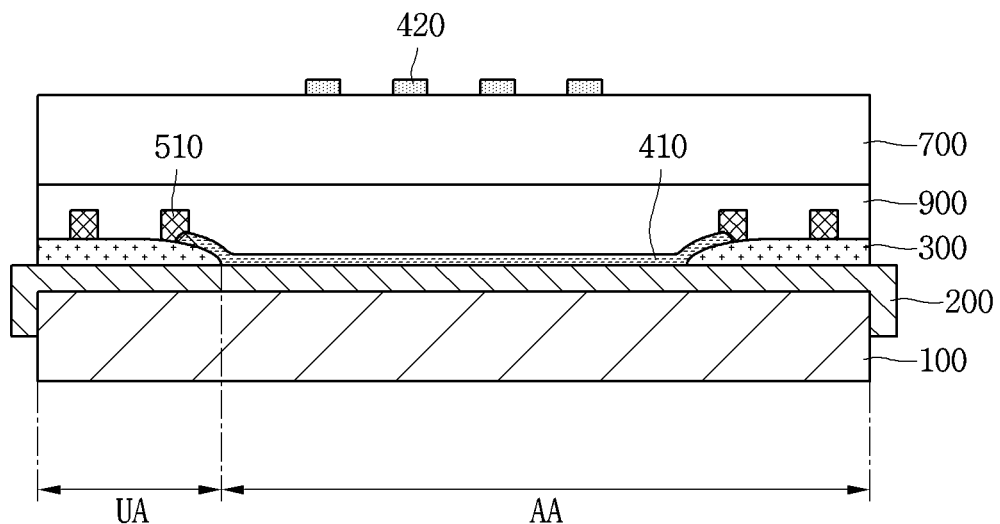

Referring to FIG. 16, the intermediate layer may be disposed on the cover substrate 100. In detail, one surface of the intermediate layer 200 may directly make contact with the cover substrate 100.

The intermediate layer 200 may come into contact with the top surface and the lateral side of the cover substrate 100. For example, as shown in FIG. 16, the intermediate layer 200 may completely or partially make contact with the lateral side of the cover substrate 100.

The sensing electrode and the wire electrode may be disposed on the other surface of the intermediate layer 200. In detail, the first wire electrode 510 may be disposed on the intermediate layer 200 corresponding to the unactive area of the cover substrate 100. In addition, the first sensing electrode 410 may be disposed on the intermediate layer 200 corresponding to the active area of the cover substrate 100. The first sensing electrode 410 may be connected to the first wire electrode 510.

The substrate 700 may be formed on the intermediate layer 200 and the second sensing electrode 420 and the second wire electrode may be disposed on the substrate 700. The substrate 700 may be bonded to the intermediate layer 200 by optically clear adhesive (OCA).

Figure 17:
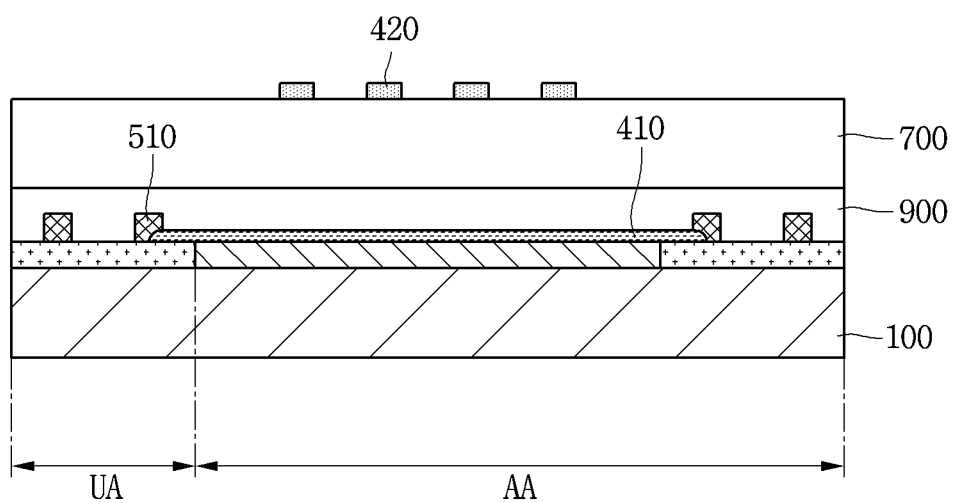

Referring to FIG. 17, the intermediate layer may be disposed on the cover substrate 100. In detail, one surface of the intermediate layer 200 may directly make contact with the cover substrate 100.

The intermediate layer 200 may be partially disposed on the top surface of the cover substrate 100. For instance, the intermediate layer 200 may be disposed on the active area of the cover substrate 100. In addition, the printing layer 300 may be disposed on the unactive area of the cover substrate 100. That is, the intermediate layer 200 and the printing layer 300 may be disposed on the same plane of the cover substrate 100.

Accordingly, the step difference caused by the printing layer may be removed by the intermediate layer, so the crack or damage to the electrode caused by the step difference of the printing layer can be prevented.

The sensing electrode may be disposed on the other surface of the intermediate layer 200. In detail, the first sensing electrode 410 may be disposed on the intermediate layer 200 corresponding to the active area of the cover substrate 100. In addition, the first wire electrode 510 may be disposed on the printing layer 300. The first sensing electrode 410 may be connected to the first wire electrode 510 formed on the printing layer 300.

The substrate 700 may be formed on the intermediate layer 200 and the second sensing electrode 420 and the second wire electrode may be disposed on the substrate 700. The second sensing electrode 420 and the second wire electrode may come into contact with the surface of the substrate 700. The substrate 700 may be bonded to the intermediate layer 200 by optically clear adhesive (OCA).

Although not shown in FIGS. 14 to 17, an adhesive layer may be further disposed between the cover substrate 100 and the intermediate layer 200. In other words, the intermediate layer 200 may directly make contact with the cover substrate 100 or indirectly make contact with the cover substrate 100 by interposing the adhesive layer, such as an optically clear adhesive layer, between the cover substrate 100 and the intermediate layer 200.

The material and thickness of the intermediate layer 200 are identical to those of the intermediate layer according to the first embodiment, so detailed description thereof will be omitted.

Hereinafter, a touch panel according to the fourth embodiment will be described in detail with reference to FIGS. 18 to 20. In the following description of the touch panel according to the fourth embodiment, description about elements and structures the same as or similar to those of the touch panel according to the first to third embodiments will be omitted. In addition, the same reference numerals will be assigned to the elements the same as those of the first to third embodiments.

Figure 18:
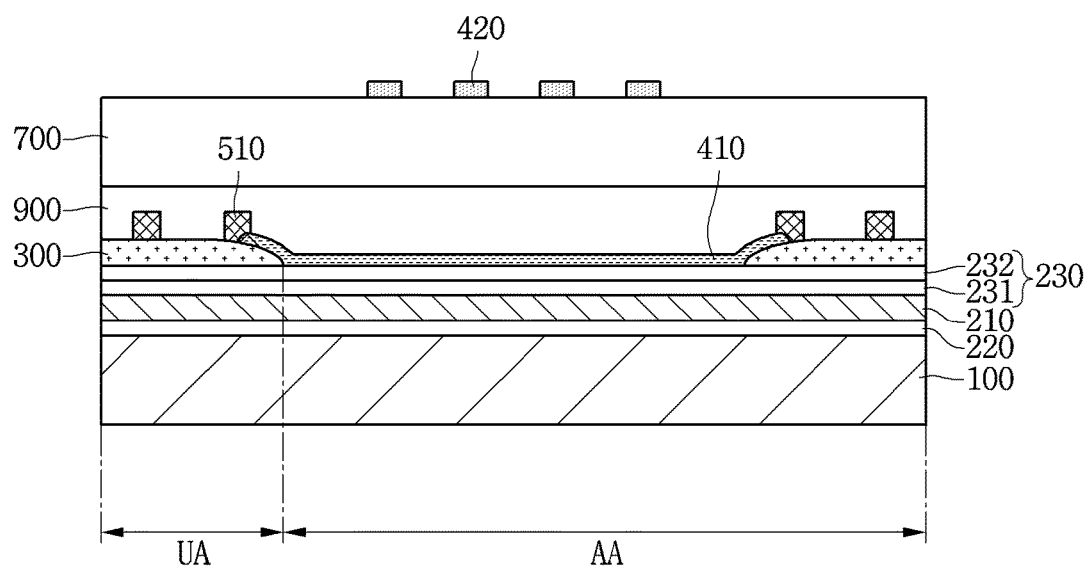
FIGS. 18 to 20 are sectional views of the touch panel according to the fourth embodiment, which are taken along line B-B' of FIG. 13.
Figure 19:
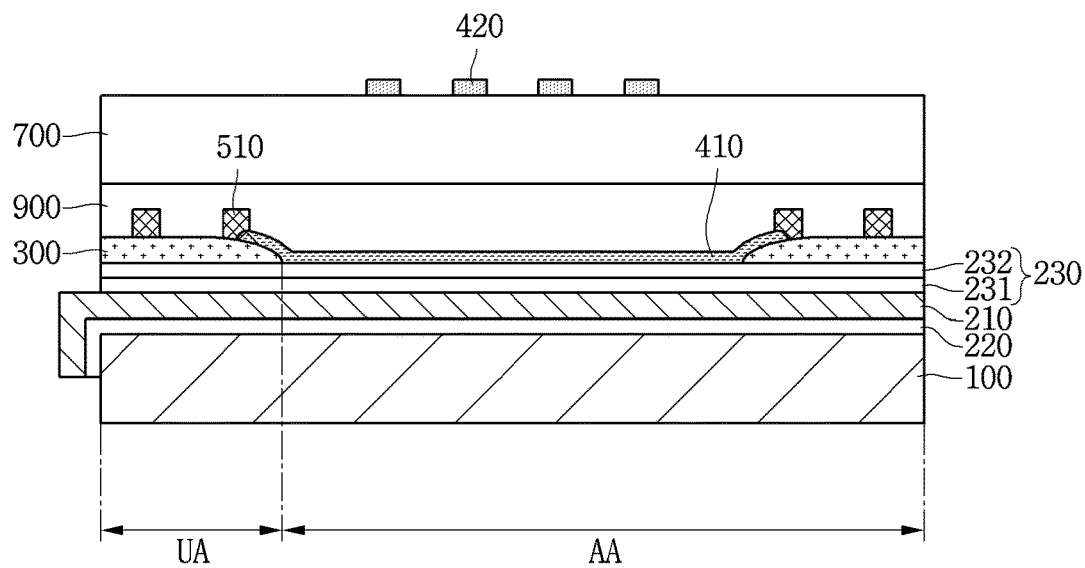
Figure 20:
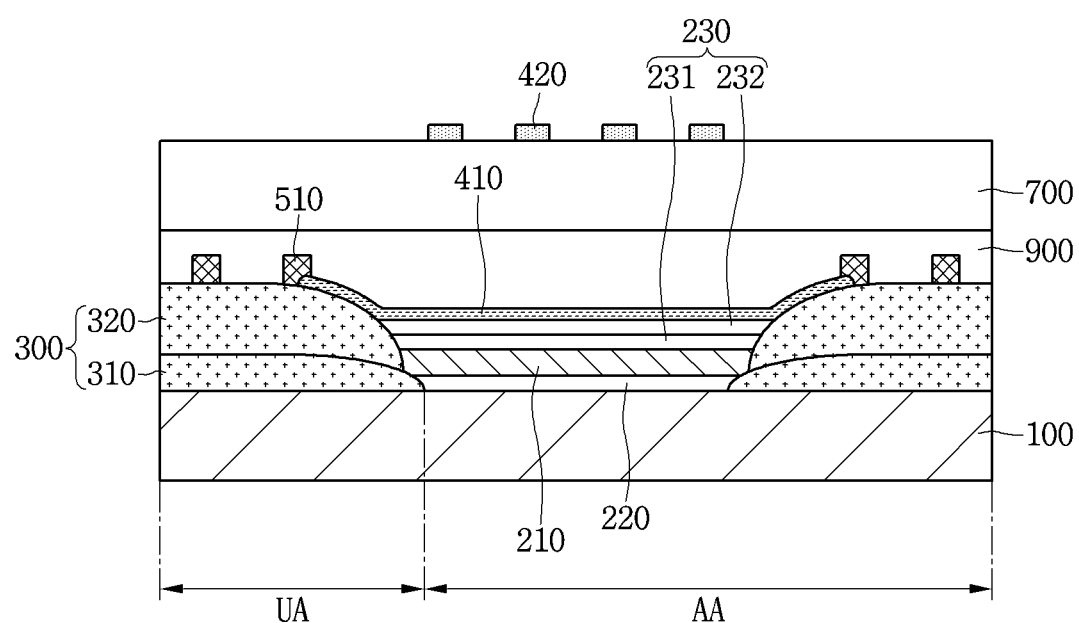

Referring to FIGS. 18 to 20, the touch panel according to the fourth embodiment may include a first intermediate layer 210, a second intermediate layer 220, and a third intermediate layer 230.

For example, the touch panel according to the fourth embodiment may include a cover substrate 100, the first intermediate layer 210 formed on the cover substrate 100, and a sensing electrode and/or a wire electrode formed on the first intermediate layer 210. The second intermediate layer 220 may be disposed between the cover substrate 100 and the first intermediate layer 210 and the third intermediate layer 230 may be disposed between the first intermediate layer 210 and the electrode.

In addition, the substrate 700 may be further disposed on the cover substrate 100. The cover substrate 100 may be combined with the substrate 700 by an adhesive layer, such as an optically clear adhesive layer.

The first intermediate layer 210 may be disposed on the cover substrate 100. For example, the first intermediate layer 210 may be disposed on the second intermediate layer 220 formed on the cover substrate 100. The first intermediate layer 210 may come into contact with the second intermediate layer 220. For example, the first intermediate layer 210 may directly come into contact with the second intermediate layer 220. Otherwise, the first intermediate layer 210 may indirectly come into contact with the second intermediate layer 220.

The thickness, composition and transmittance of the first intermediate layer 210 may be identical or similar to those of the intermediate layer 200 according to the first embodiment, so detailed description thereof will be omitted.

The second intermediate layer 220 may be disposed on the cover substrate 100. For example, the second intermediate layer 220 may be disposed between the cover substrate 100 and the first intermediate layer 210.

The second intermediate layer 220 may come into contact with the cover substrate 100. For example, the second intermediate layer 220 may directly come into contact with the cover substrate 100. Otherwise, the second intermediate layer 220 may indirectly come into contact with the cover substrate 100.

The second intermediate layer 220 may include inorganic substance. For example, the second intermediate layer 220 may include the inorganic substance, such as $SiO_2$. That is, at least one of the first and second intermediate layers 210 and 220 may include the inorganic substance.

The second intermediate layer 220 may be thinner than the first intermediate layer 210. For example, the second intermediate layer 220 may have a thickness of several nanometers (nm). For example, the second intermediate layer 220 may have a thickness of 1 nm or above. In detail, the second intermediate layer 220 may have a thickness in the range of 1 nm to 20 nm. In more detail, the second intermediate layer 220 may have a thickness in the range of 1 nm to 10 nm.

If the second intermediate layer 220 has a thickness less than 1 nm, an adhesive force of the first intermediate layer 210 formed on the second intermediate layer 220 may be lowered so that the first intermediate layer 210 may be delaminated, thereby deteriorating the reliability of the touch panel. In addition, if the second intermediate layer 220 has a thickness more than 20 nm, an overall thickness of the touch panel may be increased.

The third intermediate layer 230 may be disposed on the first intermediate layer 210. The third intermediate layer 230 may be disposed between the first intermediate layer 210 and the electrode. The third intermediate layer 230 may come into contact with the first intermediate layer 210. For example, the third intermediate layer 230 may directly come into contact with the first intermediate layer 210. Otherwise, the third intermediate layer 230 may indirectly come into contact with the first intermediate layer 210.

The third intermediate layer 230 may include at least two layers. For example, the third intermediate layer 230 may include a first sub-third intermediate layer 231 and a second sub-third intermediate layer 232. In detail, the third intermediate layer 230 may include the first sub-third intermediate layer 231 formed on the first intermediate layer 210 and the second sub-third intermediate layer 232 formed on the first sub-third intermediate layer 231.

The first sub-third intermediate layer 231 may have a refractive index different from that of the second sub-third intermediate layer 232. For example, the first sub-third intermediate layer 231 may have a refractive index higher than that of the second sub-third intermediate layer 232. That is, the first sub-third intermediate layer 231 may be a high refractive layer and the second sub-third intermediate layer 232 may be a low refractive layer.

In addition, the first sub-third intermediate layer 231 and the second sub-third intermediate layer 232 may have the same or similar thickness.

Since the third intermediate layer 230 is disposed between the cover substrate 100 and the electrode and includes the high refractive layer and the low refractive layer, the electrode can be prevented from being viewed from the outside due to the difference in refractive index between the cover substrate 100 and the electrode. For example, the third intermediate layer 230 may be an index matching layer to compensate for the difference in refractive index between the cover substrate 100 and the electrode.

At least one of the first intermediate layer 210, the second intermediate layer 220 and the third intermediate layer 230 may be disposed on at least one of the active area AA and the unactive area UA of the cover substrate 100.

For example, referring to FIG. 18, at least one of the first intermediate layer 210, the second intermediate layer 220 and the third intermediate layer 230 may be disposed on the active area AA and the unactive area UA of the cover substrate 100.

In addition, referring to FIG. 19, at least one of the first intermediate layer 210, the second intermediate layer 220 and the third intermediate layer 230 may be disposed on a lateral side of the cover substrate 100 as well as on the active area AA and the unactive area UA of the cover substrate 100. Although FIG. 19 shows the intermediate layer(s) disposed on one lateral side of the cover substrate, the embodiment is not limited thereto. The intermediate layer(s) may be disposed on all lateral sides of the cover substrate.

In addition, the intermediate layer(s) may completely or partially surround the lateral side of the cover substrate.

In addition, referring to FIG. 20, at least one of the first intermediate layer 210, the second intermediate layer 220 and the third intermediate layer 230 may be disposed only on the active area AA of the cover substrate 100. For example, the first intermediate layer 210, the second intermediate layer 220 and the third intermediate layer 230 may be disposed only on the active area AA of the cover substrate 100 and the printing layer including a first printing layer 310 and a second printing layer 320 may be disposed on the unactive area UA. In addition, one surface of the third intermediate layer 230 may be aligned on the same or similar plane with one surface of the printing layer 300.

Although FIGS. 18 to 20 show the third intermediate layer 230 disposed under the electrode, that is, between the electrode and the first intermediate layer 210, the embodiment is not limited thereto. The third intermediate layer 230 may be disposed on the electrode. That is, the third intermediate layer 230 may be disposed on the electrode without making contact with the first intermediate layer 210.

Thus, the step difference caused by the printing layer may be removed by the intermediate layers, so the crack or damage to the electrode caused by the step difference of the printing layer can be prevented.

In addition, the printing layer 300, the sensing electrode and the wire electrode may be disposed on the third intermediate layer 230. In detail, the printing layer 300 may be disposed on the third intermediate layer 230 corresponding to the unactive area of the cover substrate 100. In addition, the first sensing electrode 410 may be disposed on the third intermediate layer 230 corresponding to the active area of the cover substrate 100. The first sensing electrode 410 may be connected to the first wire electrode 510 formed on the printing layer 300.

The substrate 700 may be formed on the intermediate layer 200 and the second sensing electrode 420 and the second wire electrode may be disposed on the substrate 700. The substrate 700 may be bonded to the intermediate layer 200 by optically clear adhesive (OCA).

Hereinafter, a touch panel according to the fifth embodiment will be described with reference to FIGS. 21 to 23. In the description of the touch panel according to the fifth embodiment, details of the structures and the elements the same as those of the first to fourth embodiments will be omitted, and the same reference numerals will be assigned to the same elements.

Figure 21:
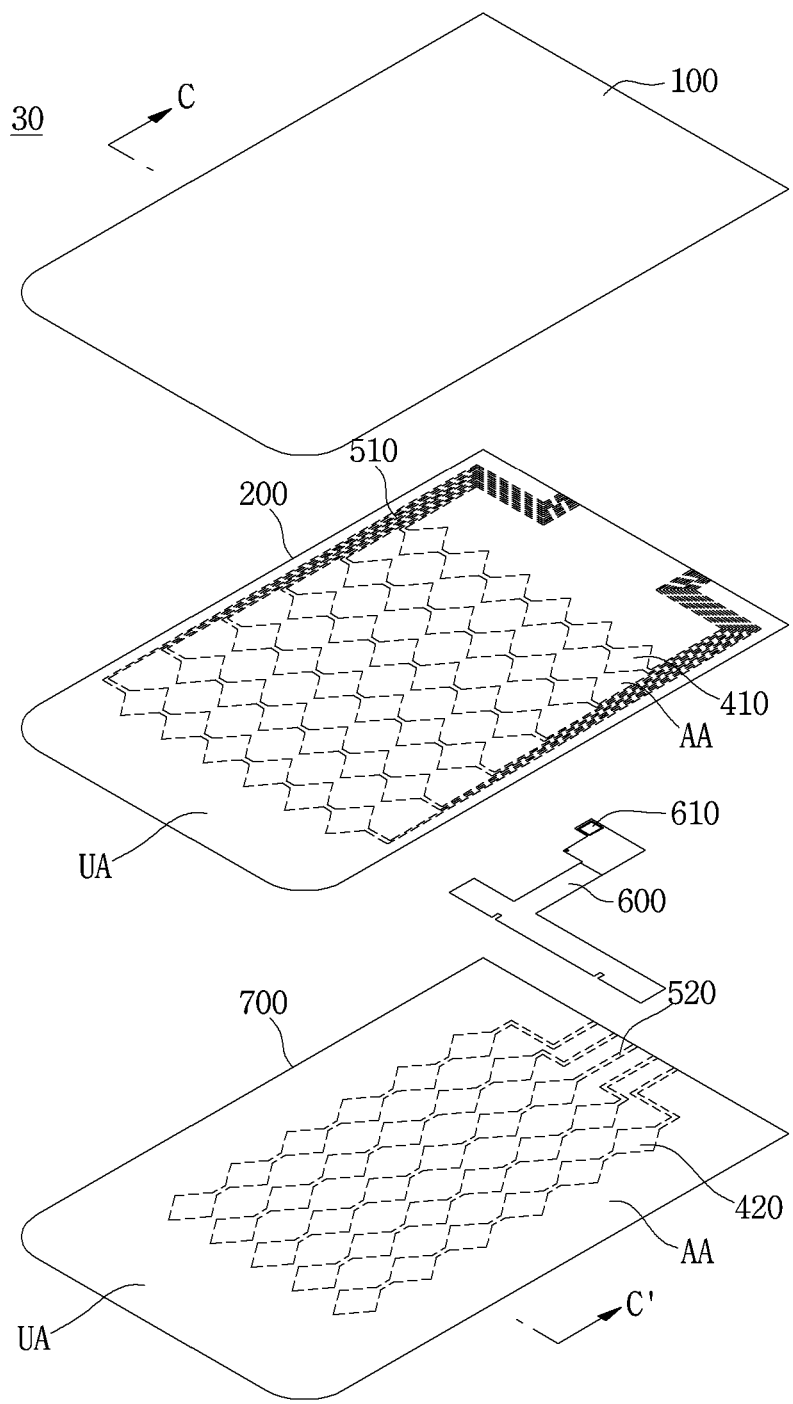
FIG. 21 is a perspective view showing a touch panel according to the fifth embodiment.
Figure 22:
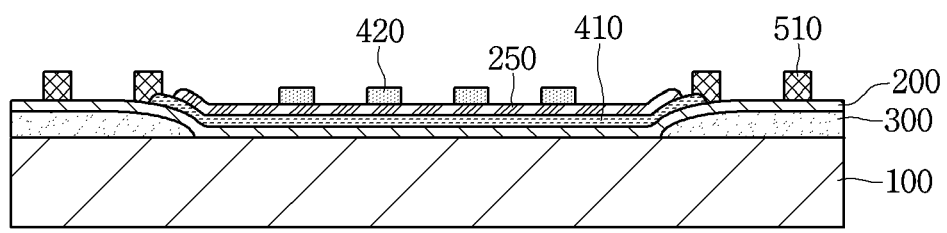
FIGS. 22 and 23 are sectional views of the touch panel according to the fifth embodiment, which are taken along line C-C' of FIG. 21.
Figure 23:
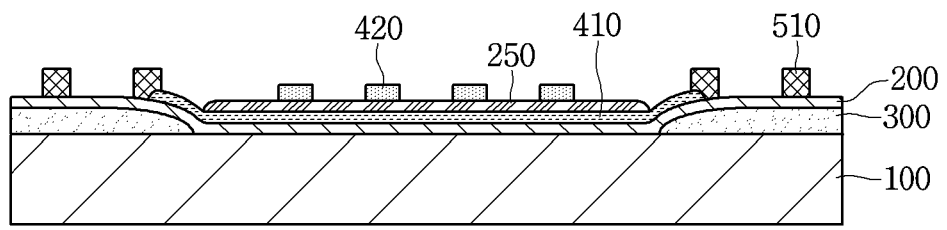

Referring to FIGS. 21 to 23, the touch panel 30 according to the third embodiment may further include a substrate 700 formed on the cover substrate 100.

The cover substrate 100 may include an active area AA and an unactive area UA. The printing layer 300 may be disposed on the unactive area UA.

In addition, the intermediate layer 200 may be disposed on at least one of the active area AA and the unactive area UA. For example, as shown in FIGS. 19 and 20, the intermediate layer 200 may be disposed on the active area AA and the unactive area UA.

Therefore, the intermediate layer 200 may come into contact with one surface of the cover substrate 100 and one surface of the printing layer 300.

The first sensing electrode 410 may be disposed on the intermediate layer 200. For example, the first sensing electrode 410 may be disposed on the intermediate layer 200 corresponding to the active area of the cover substrate 100.

In addition, the first sensing electrode 410 may be connected to the first wire electrode 510. For example, the first sensing electrode 410 may be connected to the first wire electrode 510 formed on the unactive area.

A dielectric layer 250 may be disposed on the first sensing electrode 410.

For instance, the dielectric layer 250 may include an insulating group including halogen compound of alkali metal or alkali earth metal, such as LiF, KCl, $CaF_2$, or $MgF_2$, or fused silica, such as $SiO_2$, $SiN_x$, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as $ZnO_x$, ZnS, ZnSe, TiOx, $WO_x$, $MoO_x$, or $ReO_x$; an organic semiconductor group including Alq3, NPB, TAPC, 2TNATA, CBP or Bphen; and a low-K material such as silsesquioxane or a derivative $((H-SiO_{3/2})_n)$ thereof, methylsilsesquioxane $(CH_3-SiO_{3/2})_n)$, porous silica or porous silica doped with fluorine or carbon atoms, porous zinc oxide $(ZnO_x)$, cyclized-perfluoropolymer (CY-TOP) or a mixture thereof.

The dielectric layer 250 may have visible ray transmittance of about 79% to about 99%.

A thickness T2 of the dielectric layer 250 may be less than a thickness of the cover substrate 100. In detail, the thickness of the dielectric layer 250 may be 0.01 to 0.7 times the thickness of the cover substrate 100. For example, the thickness of the cover substrate 100 may be about 0.1 mm and the thickness of the dielectric layer 250 may be 0.01 mm, but the embodiment is not limited thereto.

In addition, the dielectric layer 250 may have a sectional area different from a sectional area of the cover substrate 100. In detail, the dielectric layer 250 may have the sectional area smaller than the sectional area of the cover substrate 100.

The dielectric layer 250 may be directly disposed on a top surface of the cover substrate 100. That is, the dielectric layer 250 may be formed by directly applying a dielectric material on the cover substrate 100 where the first sensing electrode 410 is disposed, that is, on the top surface of the intermediate layer 200.

The dielectric layer 250 may be disposed on at least one of the active area AA and the unactive area UA. For example, as shown in FIG. 19, the dielectric layer 250 may be disposed on both of the active area AA and the unactive area UA. In addition, as shown in FIG. 20, the dielectric layer 250 may be disposed only on the active area AA.

The second sensing electrode 420 may be disposed on the dielectric layer 250. For example, the second sensing electrode 420 may be disposed on the dielectric layer 250 and extend in the direction different from the extension direction of the first sensing electrode.

Different from the third and fourth embodiments described above, the touch panel according to the fifth embodiment may omit the adhesive layer that bonds the cover substrate 100 with the substrate 700. That is, the sensing electrode is disposed on the dielectric layer 250 other than the substrate 700 and the dielectric layer 250 has the adhesive property and the thickness thinner than the thickness of the substrate 700, so that the overall thickness of the touch panel may be reduced.

Hereinafter, a touch panel according to the sixth embodiment will be described with reference to FIGS. 24 to 28. In the description of the touch panel according to the sixth embodiment, details of the structures and the elements the same as those of the first to fifth embodiments will be omitted, and the same reference numerals will be assigned to the same elements.

Figure 24:
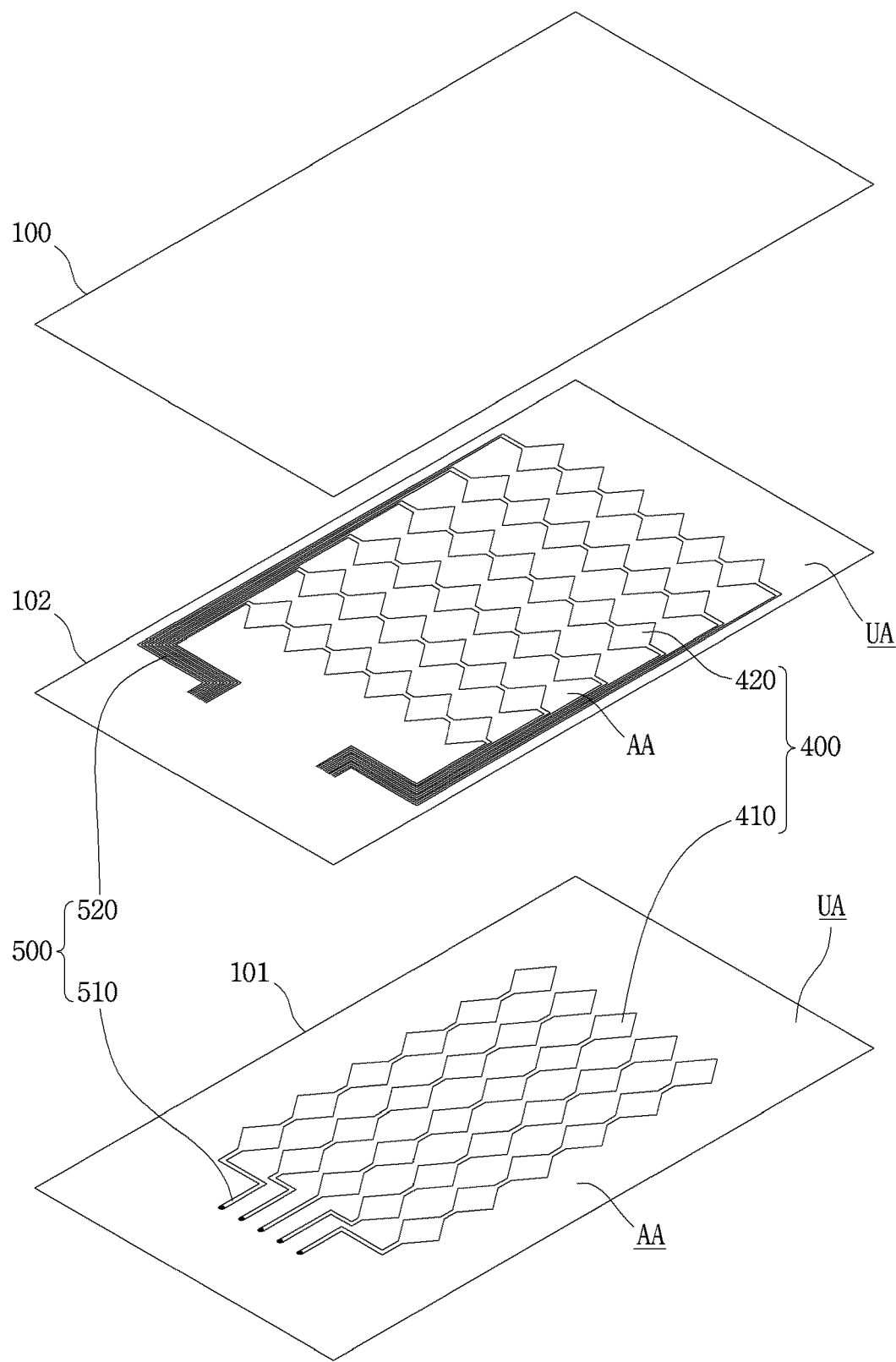
FIGS. 24 to 28 are views to explain a touch panel according to the sixth embodiment.
Figure 25:
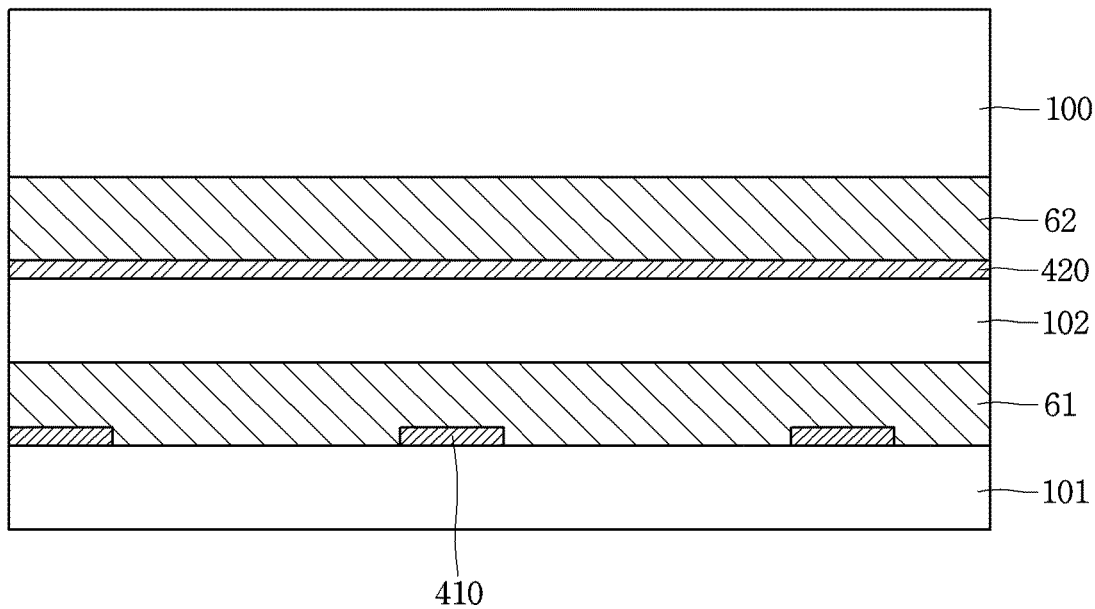

Referring to FIGS. 24 and 25, the touch panel according to the sixth embodiment may include a first substrate 101 and a second substrate 102 classified as an active area AA and an unactive area UA. The second substrate 102 may be disposed on the first substrate 101. A first adhesive layer 61 may be disposed between the first substrate 101 and the second substrate 102. The first adhesive layer 61 may include optically clear adhesive (OCA) or optically clear resin (OCR).

A cover substrate 100 including an active area AA and an unactive area UA may be disposed on the second substrate 102. A second adhesive layer 62 may be disposed between the second substrate 102 and the cover substrate 100. The second adhesive layer 62 may include optically clear adhesive (OCA) or optically clear resin (OCR). The second adhesive layer 62 may come into contact with the electrode disposed on the second substrate 102.

The first and second substrates 101 and 102 may support a sensing electrode 400, a wire 500 and a circuit board mounted on the first and second substrates 101 and 102. At least one of the first and second substrates 101 and 102 may be formed of resin. In detail, at least one of the first and second substrates 101 and 102 may be formed of photo-curable resin. In this case, the substrate, which does not include the resin, may be formed of various materials capable of supporting the sensing electrode 400, the wire 500 and the circuit board.

The sensing electrode 400 may correspond to the active area of the cover substrate and may be disposed on the first substrate 101 and/or the second substrate 102 including the photo-curable resin. That is, the sensing electrode 400 may be disposed on the surface of the photo-curable resin.

That is, the first and second substrates 101 and 102 may be formed of the same material. In this case, the first and second substrates 101 and 102 may be formed of the resin.

In addition, the first and second substrates 101 and 102 may be formed of mutually different materials. In this case, one of the first and second substrates 101 and 102 may be formed of the resin, and the other may be formed of another material. Preferably, the second substrate 102 is formed of the resin, and the first substrate 101 is formed of another material.

The first substrate 101 may include plastic. For instance, the first substrate 101 may include reinforced or flexible plastic, such as polyethylene terephthalate (PET) or polyimide (P1). In addition, the first substrate 101 may include an optical isotropic film. For example, the first substrate 101 may include cyclic olefin copolymer (COC), cyclic olefin polymer (COP), optical isotropic polycarbonate (PC), or optical isotropic polymethyl methacrylate (PMMA). Further, the first substrate 101 may include sapphire.

For example, one of the first and second substrate 101 and 102 may be formed of the resin and the other may be formed of the sapphire. Preferably, the second substrate 102 is formed of the resin, and the first substrate 101 is formed of the sapphire.

In other words, the second substrate 102 may be formed of the resin, and the first substrate 101 may be formed of a material having strength higher than that of the second substrate 102. Thus, the cover substrate 100 and the first substrate 101 having superior strength may be disposed at uppermost and lowermost portions of the touch window, so that the strength can be enhanced and the reliability can be improved.

Since the touch window according to the embodiment includes at least one resin formed of the resin, the substrate and the touch window may have the flexibility. In addition, the substrate formed of the resin may have a thickness in the range of 0.5 μm to 50 μm. Preferably, the substrate may have a thickness in the range of 0.5 μm to 20 μm. More preferably, the substrate may have a thickness in the range of 1 μm to 10 μm. That is, the substrate formed of the resin may have the thickness thinner than the thickness of the plastic substrate.

Especially, if the second substrate 102, which is disposed with respect to the cover substrate 100 while interposing the second adhesive layer 62 therebetween, is formed of the resin, the strength of the touch window may be enhanced.

Figure 26:
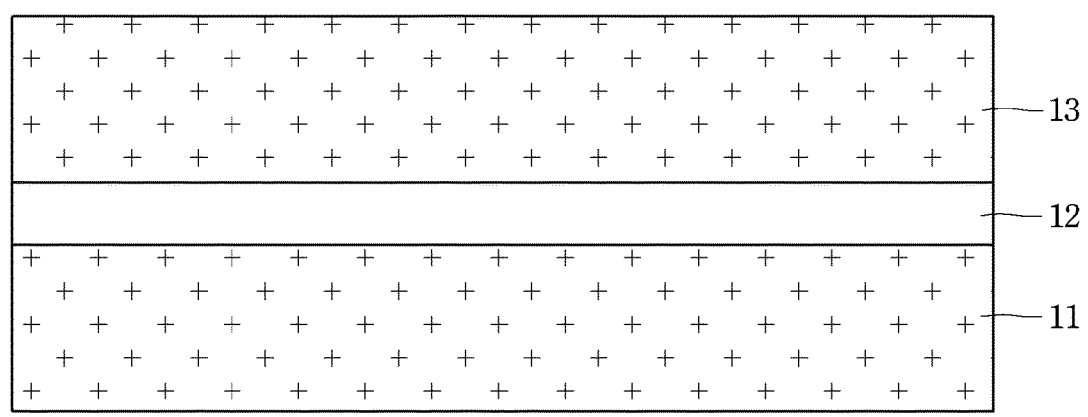

Hereinafter, a method of fabricating the touch window according to the embodiment will be described with reference to FIGS. 26 to 28. Referring to FIG. 26, a resin layer 12 may be prepared between a lower release film 11 and an upper release film 13. The lower release film 11 may support the resin layer 12 and the upper release film 13 may flatten the resin layer 12. That is, if the resin layer 12 has sufficient flatness, the upper release film 13 may be omitted.

The resin layer 12 may be formed of photo-curable resin. Preferably, the resin layer 12 may be formed of UV-curable resin. The photo-curable resin may shorten the curing time.

Figure 27:
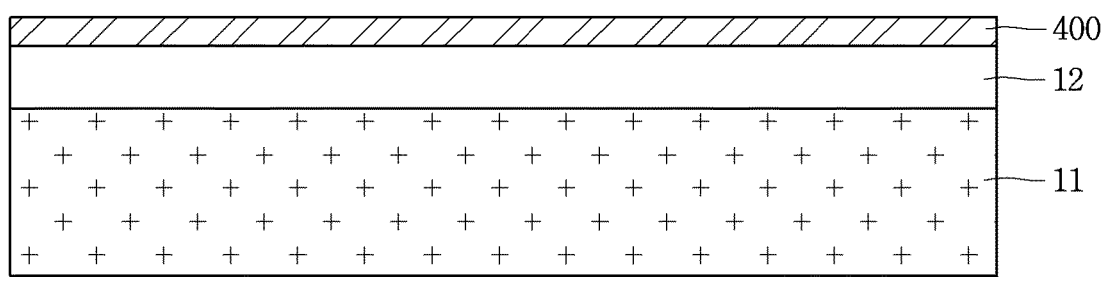

Referring to FIG. 27, the upper release film 13 is released and the sensing electrode 200 is formed on the top surface of the resin layer 12. The sensing electrode 200 may be a first sensing electrode or a second sensing electrode. That is, the sensing electrode 200 may extend in one direction.

Since the lower release film 11 supports the resin layer 12, the sensing electrode 200 may be stably formed. That is, if the lower release film 11 is omitted, the resin layer 12 may not be supported, so the pattern of the sensing electrode 200 formed on the resin layer 12 may be defected.

Figure 28:
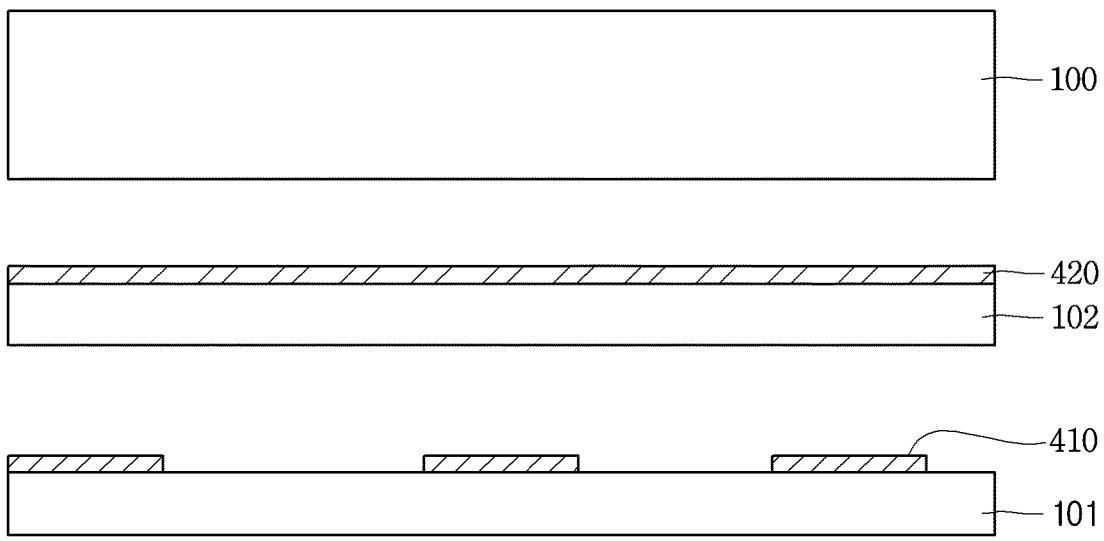

Referring to FIG. 28, the lower release film 11 may be removed after the sensing electrode 200 has been formed. Thus, the resin layer 12 may serve as the first substrate 101 or the second substrate 102. That is, at least one of the first substrate 101 and the second substrate 102 may be formed of the resin layer 12.

The second substrate 102 having the second sensing electrode 420 may be formed on the first substrate 101 having the first sensing electrode 410. In addition, the cover substrate 100 may be disposed on the second substrate 102. The first substrate 101 may be combined with the second substrate 102 by interposing an adhesive layer therebetween. In addition, the second substrate 102 may be combined with the cover substrate 100 by interposing an adhesive layer therebetween. The adhesive layer may include OCA or OCR.

Although it has been illustrated in the drawings that the lower release film 11 is released before the combining step, the embodiment is not limited thereto. For instance, the lower release film 11 may be released from the second substrate 102 after the cover substrate 100 has been combined with the second substrate 102 by the adhesive layer. In addition, the lower release film 11 may be released from the first substrate 101 after the second substrate 102 has been combined with the first substrate 101 by the adhesive layer.

Therefore, the touch window according to the embodiment may enable the touch function and may be driven even when the cover substrate 100 is damaged or defected and the thickness of the touch window can be reduced. In the case of a PET substrate according to the related art, it is difficult to form the electrode pattern if the thickness is 50 μm or less. However, the touch window according to the embodiment may provide the substrate having a thickness less than 50 μm.

In addition, the cover substrate 100 can be prevented from being weakened and the strength of the cover substrate 100 can be enhanced, so that the scattering can be prevented. Further, the substrate formed of the resin may improve the flexibility, so that the flexible, curved or bended property of the touch window can be ensured.

Hereinafter, the disclosure will be made in more detail with reference to the embodiments and comparative examples. The embodiments are illustrative purposes only and do not intend to limit the scope of the disclosure.

Embodiment 1

A resin layer was formed by coating a resin composition on a cover substrate, and indium tin oxide was deposited on the resin layer and patterned to form the sensing electrode, thereby fabricating a touch panel.

The resin composition was prepared by about 20 wt % of acrylic copolymer, about 15 wt % of cross-linking agent, about 2 wt % of photo initiator, about 5 wt % of additive, about 10 wt % of DE acetate and about 48 wt % of MEDG.

In addition, the thickness of the resin layer was about 2 μm.

Then, the ball drop test was performed while varying the height with respect to the cover substrate to measure the failure based on the breakage of the cover substrate.

In addition, transmittance of the touch panel was measured.

Embodiment 2

The touch panel was fabricated under the same condition of embodiment 1 except that the resin layer had a thickness of about 2.5 μm and the breakage and transmittance of the cover substrate were measured.

Comparative Example 1

The touch panel was fabricated under the same condition of embodiment 1 except that the resin layer had a thickness of about 1.5 μm and the breakage and transmittance of the cover substrate were measured.

Comparative Example 2

The touch panel was fabricated under the same condition of embodiment 1 except that the resin layer had a thickness of about 3.0 μm and the breakage and transmittance of the cover substrate were measured.

TABLE 1

|  | Embodiment 1 | Embodiment 2 | Comparative Example 1 | Comparative Example 2 |
| --- | --- | --- | --- | --- |
| 50 cm | Normal | Normal | Broken | Normal |
| 60 cm | Normal | Normal | Broken | Normal |
| 70 cm | Normal | Normal | Broken | Normal |
| 80 cm | Normal | Normal | Broken | Normal |
| 90 cm | Normal | Normal | Broken | Normal |
| 100 cm | Normal | Normal | Broken | Normal |
| 110 cm | Normal | Normal | Broken | Normal |

TABLE 2

|  | Transmittance |
| --- | --- |
| Embodiment 1 | 89.67 |
| Embodiment 2 | 89.29 |
| Embodiment 3 | 89.85 |
| Embodiment 4 | 84.83 |

Referring to tables 1 and 2, it can be understood that the cover substrate was not broken in the ball drop test at the height of about 110 cm when the intermediate layer, that is, the resin layer had a thickness in the range of about 2 μm to 2.5 μm.

In addition, when the resin layer had a thickness less than 2 μm, the cover substrate was broken in the ball drop test. The transmittance was lowered when the resin layer had a thickness more than 2.5 μm.

In other words, the touch panel according to the embodiments can prevent the degradation of the strength of the cover substrate in the process of forming the electrode by forming the electrode on the resin layer after forming the resin layer on the cover substrate and can prevent the degradation of transmittance caused by the resin layer.

Therefore, the touch panel according to the embodiments can improve the reliability and the visibility.

Embodiment 3

A resin layer was formed by coating a resin composition on $SiO_2$ after forming the $SiO_2$ on a cover substrate, and indium tin oxide was deposited on the resin layer and patterned to form the sensing electrode, thereby fabricating a touch panel.

The resin composition was prepared by about 20 wt % of acrylic copolymer, about 15 wt % of cross-linking agent, about 2 wt % of photo initiator, about 5 wt % of additive, about 10 wt % of DE acetate and about 48 wt % of MEDG.

In addition, the thickness of the resin layer was about 2 μm.

The thickness of the $SiO_2$ was about 5 nm.

Then, delamination of the resin layer was measured.

Comparative Example 3

The touch panel was fabricated under the same condition of embodiment 3 except that the resin layer was formed by directly coating a resin composition on a cover substrate without forming $SiO_2$ on the cover substrate and delamination of the resin layer was measured.

TABLE 3

|  | Delamination |
| --- | --- |
| Embodiment 3 | No |
| Comparative Example 3 | Yes |

Referring to table 3, it can be understood that the resin layer was not delaminated when the resin layer was disposed on an inorganic layer after forming the inorganic layer, such as $SiO_2$, on the intermediate layer, that is, the cover substrate.

In other words, the touch panel according to the embodiment can improve the reliability by preventing the delamination of the resin layer by forming the resin layer on the inorganic layer after forming the inorganic layer on the cover substrate.

Hereinafter, a touch device formed by assembling the above-described touch window with a display panel will be described with reference to FIGS. 29 to 32.

Figure 29:
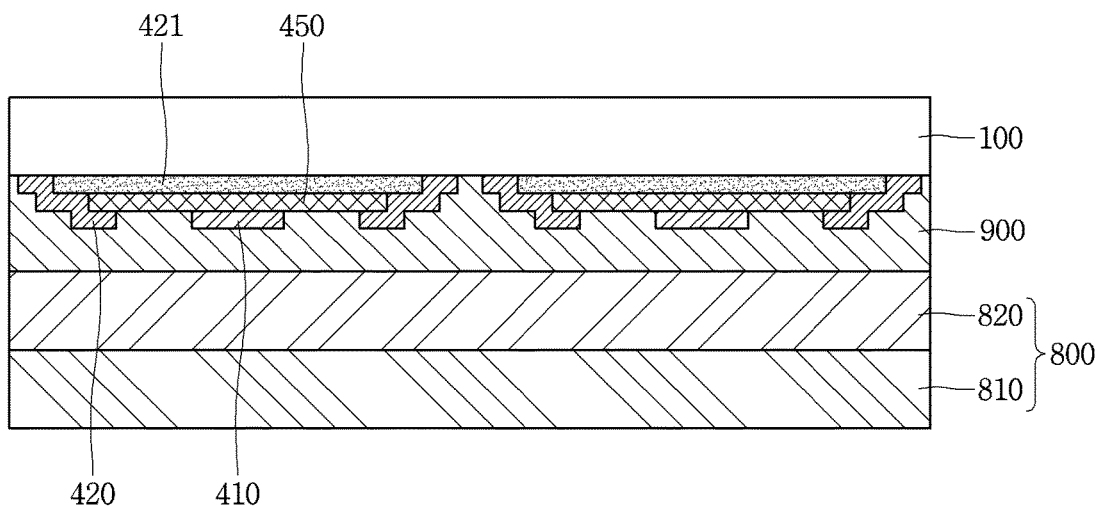
FIGS. 29 to 32 are views showing touch devices including a touch panel coupled with a display panel according to the embodiment.
Figure 30:
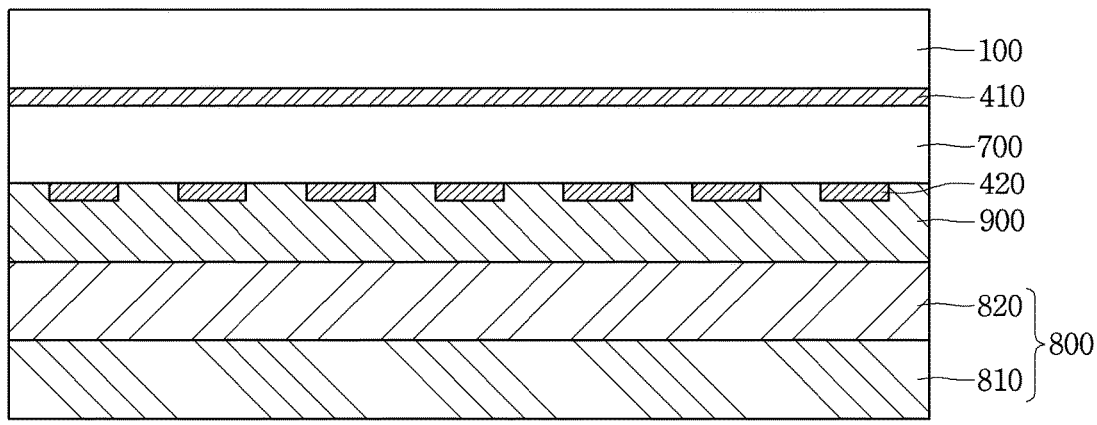

Referring to FIGS. 29 and 30, the touch device according to the embodiment may include a touch panel provided on a display panel 800.

In detail, referring to FIG. 29, the touch device may be formed by assembling the cover substrate 100 with the display panel 800. The cover substrate 100 may be bonded to the display panel 800 through an adhesive layer 900. For example, the cover substrate 100 may be combined with the display panel 800 through the adhesive layer 700 including the OCA.

In addition, referring to FIG. 30, when the substrate 700 is additionally provided on the cover substrate 100, the touch device may be formed by assembling the substrate 700 with the display panel 800. The substrate 700 may be bonded to the display panel 800 through the adhesive layer 900. For example, the substrate 700 may be combined with the display panel 800 through the adhesive layer 700 including the OCA.

The display panel 800 may include $1^{st}$ and $2^{nd}$ substrates 810 and 820.

When the display panel 800 is a liquid crystal display panel, the display panel 800 may be formed in a structure in which the $1^{st}$ substrate 810 including a thin film transistor (TFT) and a pixel electrode is combined with the $2^{nd}$ substrate 820 including color filter layers while a liquid crystal layer is interposed between the $1^{st}$ and $2^{nd}$ substrates 810 and 820.

In addition, the display panel 800 may be a liquid crystal display panel having a COT (color filter on transistor) structure in which a thin film transistor, a color filter, and a black matrix are formed on the $1^{st}$ substrate 810, and the $1^{st}$ substrate 810 is combined with the $2^{nd}$ substrate 820 while a liquid crystal layer is interposed between the $1^{st}$ and $2^{nd}$ substrates 810 and 820. In other words, the thin film transistor may be formed on the $1^{st}$ substrate 810, a protective layer may be formed on the thin film transistor, and the color filter layer may be formed on the protective layer. In addition, a pixel electrode making contact with the thin film transistor is formed on the $1^{st}$ substrate 810. In this case, in order to improve the aperture rate and simplify the mask process, the black matrix may be omitted, and the common electrode may perform the inherent function thereof and the function of the black matrix.

In addition, when the display panel 800 is a liquid crystal panel, the display device may further include a backlight unit for providing light from the rear surface of the display panel 800.

When the display panel 800 is an organic electroluminescent display panel, the display panel 800 includes a self-light emitting device which does not require any additional light source. The display panel 800 includes a thin film transistor formed on the $1^{st}$ substrate 810 and an organic light emitting device (OLED) making contact with the thin film transistor. The OLED may include an anode, a cathode and an organic light emitting layer formed between the anode and the cathode. In addition, the $2^{nd}$ substrate 820 may be further formed on the organic light emitting device to perform the function of an encapsulation substrate for encapsulation.

Figure 31:
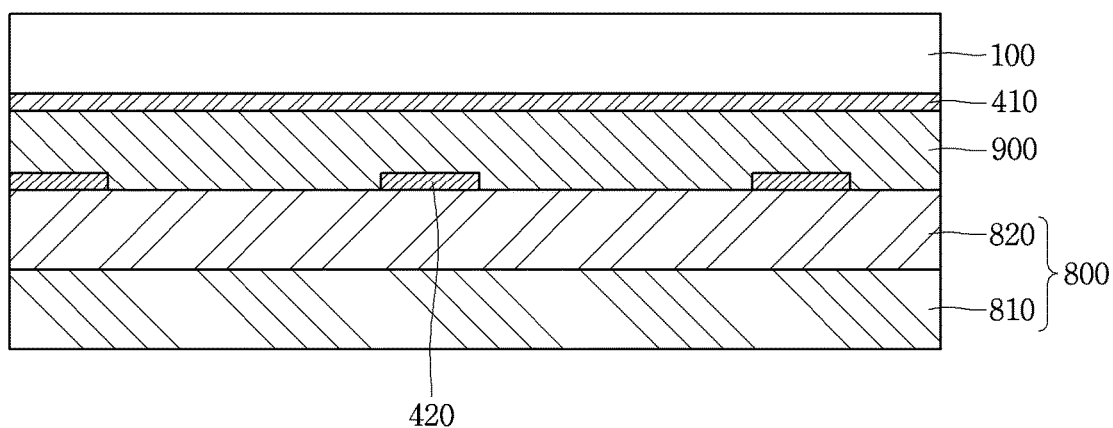

Referring to FIG. 31, the touch device according to the embodiment may include a touch panel integrally formed with the display panel 800. In other words, the substrate to support at least one sensing electrode may be omitted.

In detail, at least one sensing electrode may be provided on at least one surface of the display panel 800. In other words, at least one sensing electrode may be formed on at least one surface of the $1^{st}$ substrate 810 or the $2^{nd}$ substrate 820.

In this case, at least one sensing electrode may be formed on a top surface of a substrate disposed at an upper portion.

Referring to FIG. 31, the first sensing electrode 410 may be provided on one surface of the cover substrate 100. In addition, a first wire connected with the first sensing electrode 410 may be provided. The second sensing electrode 420 may be provided on one surface of the display panel 800. In addition, a second wire connected with the second sensing electrode 420 may be provided.

The adhesive layer 900 is interposed between the cover substrate 100 and the display panel 800, so that the cover substrate 100 may be combined with the display panel 800.

In addition, a polarizing plate may be additionally provided under the cover substrate 100. The polarizing plate may be a linear polarizing plate or an anti-reflection polarizing plate. For example, when the display panel 800 is a liquid crystal panel, the polarizing plate may include a linear polarizing plate. In addition, when the display panel 800 is an organic electroluminescent display panel, the polarizing plate may be an anti-reflection polarizing plate.

At least one substrate to support the sensing electrode may be omitted from the touch device according to the embodiment. Accordingly, a thin and light touch device can be formed.

Hereinafter, a touch device according to another embodiment will be described with reference to FIG. 32. Details of the structures and the elements the same as those of the previous embodiments will be omitted, and the same reference numerals will be assigned to the same elements.

Figure 32:
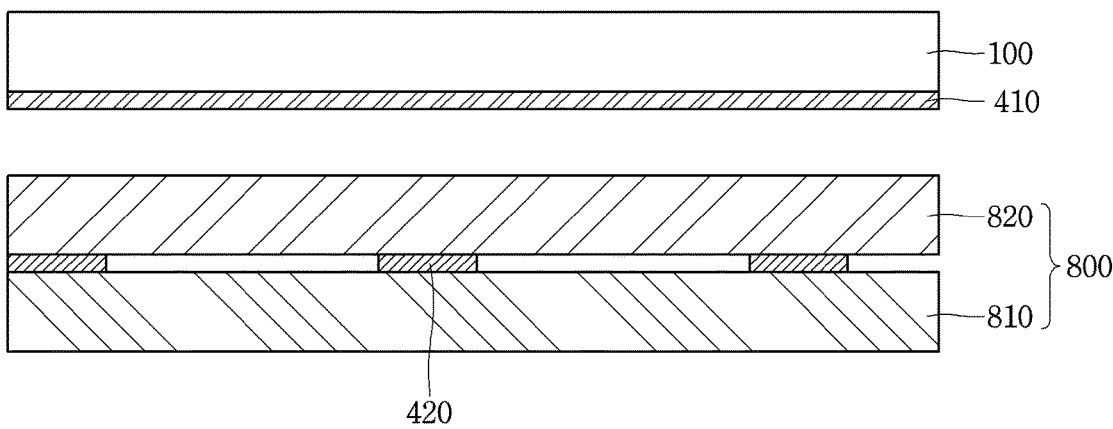

Referring to FIG. 32, the touch device according to the embodiment may include a touch panel formed integrally with the display panel 800. In other words, a substrate to support at least one sensing electrode may be omitted.

For example, a sensing electrode provided in the active area to serve as a sensor which senses a touch and a wire to apply an electrical signal to the sensing electrode may be formed inside the display panel. In detail, at least one sensing electrode or at least one wire may be formed inside the display panel.

The display panel 800 includes the $1^{st}$ substrate 810 and the $2^{nd}$ substrate 820. In this case, at least one of the first and second sensing electrodes 410 and 420 is provided between the $1^{st}$ substrate 810 and the $2^{nd}$ substrate 820. In other words, at least one sensing electrode may be provided on at least one surface of the $1^{st}$ substrate 810 or the $2^{nd}$ substrate 820.

Referring to FIG. 32, the first sensing electrode 410 may be provided on one surface of the cover substrate 100. In addition, the first wire connected with the first sensing electrode 410 may be provided. The second sensing electrode 420 and the second wire may be interposed between the $1^{st}$ substrate 810 and the $2^{nd}$ substrate 820. In other words, the second sensing electrode 420 and the second wire may be provided inside the display panel, and the first sensing electrode 410 and the first wire may be provided outside the display panel.

The second sensing electrode 420 and the second wire may be provided on the top surface of the $1^{st}$ substrate 810 or the rear surface of the $2^{nd}$ substrate 820.

In addition, a polarizing plate may be additionally provided under the cover substrate 100.

When the display panel is a liquid crystal panel, and when the second sensing electrode is formed on the top surface of the first substrate 810, the second sensing electrode may be formed together with a thin film transistor (TFT) or a pixel electrode. In addition, when the second sensing electrode is formed on the rear surface of the second substrate 820, a color filter layer may be formed on the sensing electrode or the sensing electrode may be formed on the color filter layer. When the display panel is an organic electroluminescent display panel, and when the second sensing electrode is formed on the top surface of the first substrate 810, the second sensing electrode may be formed together with a thin film transistor or an organic light emitting device.

At least one substrate to support the sensing electrode may be omitted from the touch device according to the embodiment. Accordingly, a thin and light touch device can be formed. In addition, the sensing electrode and the wire are formed together with a device formed in the display panel, so that a process can be simplified and a cost can be reduced.

FIGS. 33 to 36 are views showing one example of a touch device employing a touch window according to the embodiment.

Figure 33:
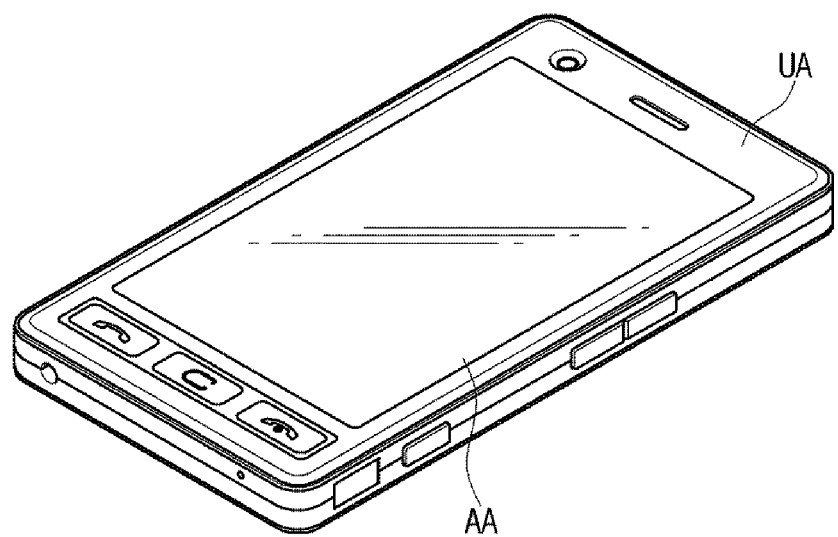
FIGS. 33 to 36 are views showing touch devices including a touch panel according to the embodiments.

Referring to FIG. 33, a mobile terminal may include the active area AA and the unactive area UA. The active area AA is a region in which a touch signal is sensed due to the touch by a finger, and an instruction icon pattern part and a logo may be formed in the unactive area UA.

Figure 34:
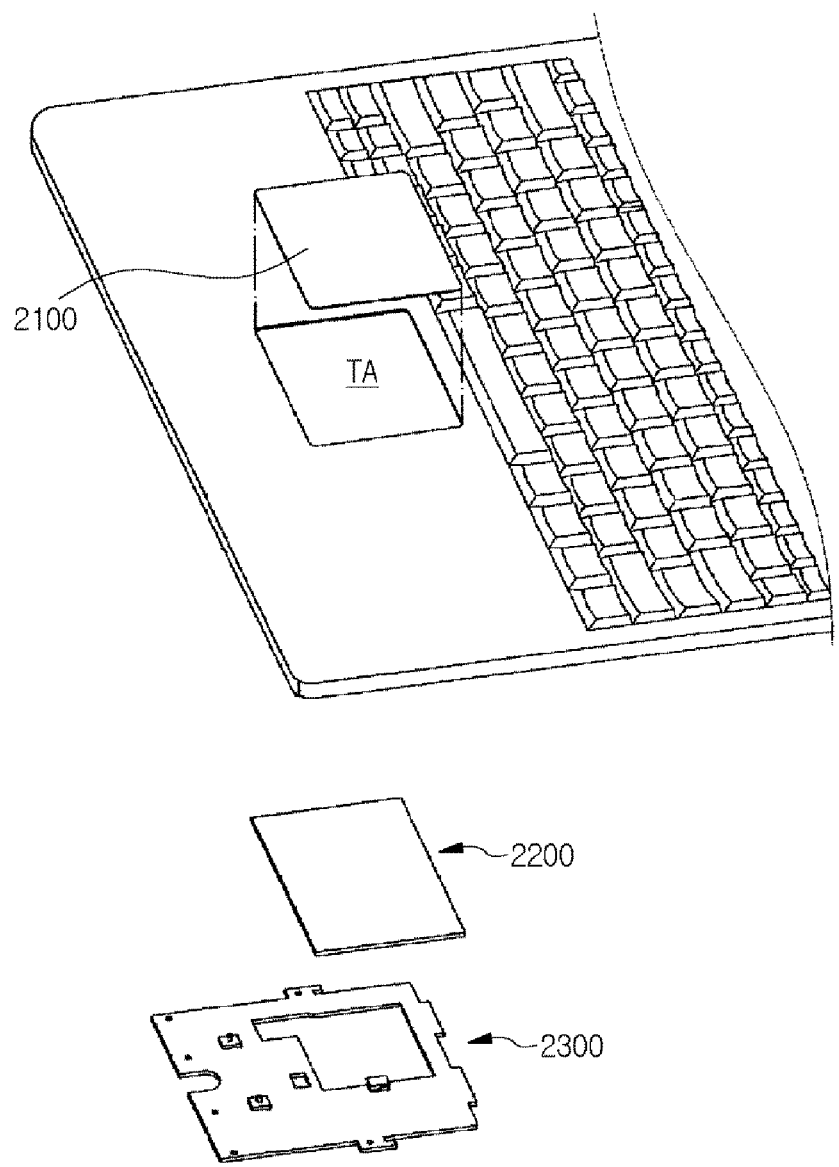

Referring to FIG. 34, a portable notebook is shown as an example of a display device. The portable notebook may include a touch panel 2200, a touch sheet 2100, and a circuit board 2300. The touch sheet 2100 may be disposed on a top surface of the touch panel 2200. The touch sheet 2100 may protect a touch area TA. In addition, the touch sheet 2100 may improve the touch feeling of the user. Further, the circuit board 2300 is electrically connected to a bottom surface of the touch panel 2200. The circuit board 2300 is a printed circuit board on which various components of the portable notebook may be mounted.

Figure 35:
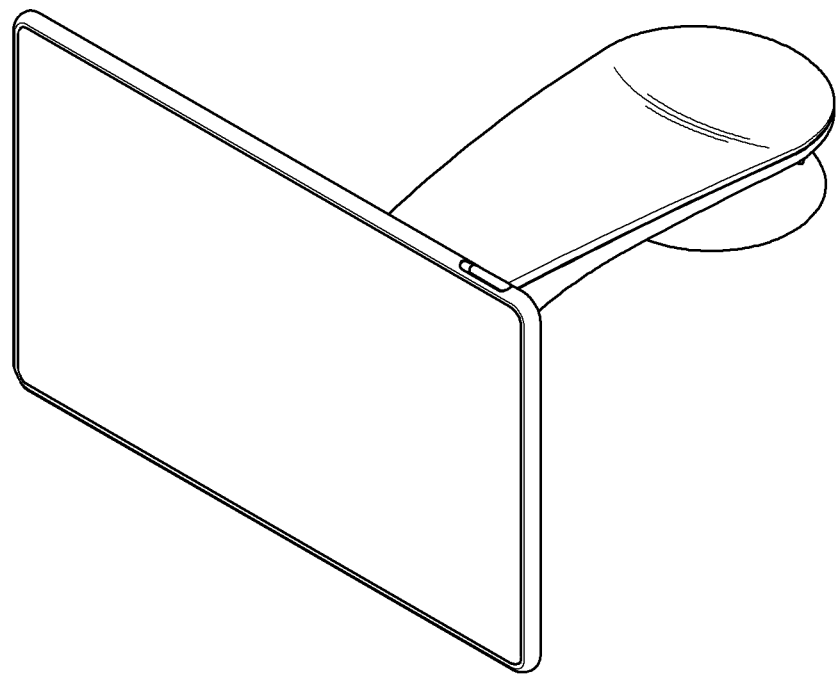

In addition, referring to FIG. 35, the touch panel may be applied to a vehicle navigation system.

Figure 36:
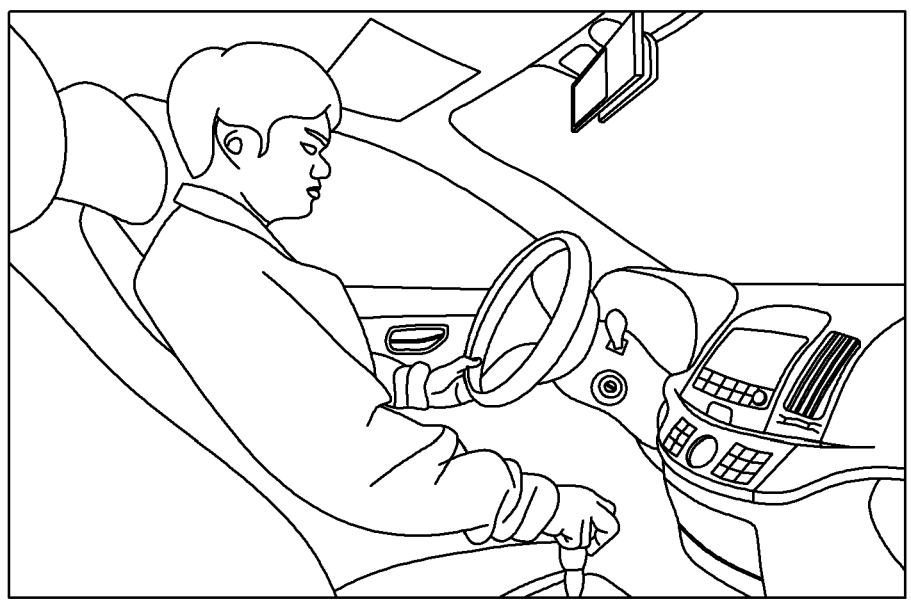

Referring to FIG. 36, the touch panel may be applied inside a vehicle. In other words, the touch panel may be applied to various parts in the vehicle where the touch window is applied. Accordingly, the touch panel is applied to a dashboard as well as a PND (Personal Navigation Display), thereby realizing a CID (Center Information Display). However, the embodiment is not limited thereto. In other words, the touch window may be used in various electronic products. In addition, the touch window may be applied to a wearable device put on a human body.

The embodiment provides a touch panel having improved reliability.

According to the embodiment, there is provided a touch panel including: a cover substrate including an active area and an unactive area; an intermediate layer on the cover substrate; and an electrode on the intermediate layer, wherein the intermediate layer includes an acrylic resin composition.

The touch panel according to the embodiment may reinforce the strength of the cover substrate.

That is, according to the touch panel of the embodiment, an intermediate layer including a resin is disposed on the cover substrate and then the electrode is disposed on the intermediate layer.

Therefore, the strength of the cover substrate may not be lowered in the process of forming the electrode. That is, since the electrode is formed on the intermediate layer after forming the intermediate layer on the cover substrate without directly forming the electrode on the cover substrate, the affect directly exerted upon the cover substrate in the process of forming the electrode may be reduced.

Thus, the touch panel according to the embodiment can prevent the degradation of the strength of the cover substrate, thereby improving the reliability.

In addition, according to the touch panel of the embodiment, the intermediate layer may be disposed after another intermediate layer is disposed on the cover substrate.

In this case, the intermediate layer may not be delaminated from the cover substrate, so that the reliability of the touch window can be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a cover substrate including an active area and an unactive area;
   a printing layer on the unactive area of the cover substrate;
   a first intermediate layer on the active area and the unactive area of the cover substrate, and comprising an organic substance;
   a second intermediate layer on the first intermediate layer;
   a connection electrode on the second intermediate layer corresponding to the active area;
   a sensing electrode on the second intermediate layer corresponding to the active area; and
   a wire electrode disposed on at least one of the first and second intermediate layers corresponding to the unactive area and connected to the sensing electrode,
   wherein the sensing electrode includes a first sensing electrode and a second sensing electrode extending in different directions on the same surface of the second intermediate layer,
   wherein the connection electrode includes a first connection electrode connecting to the first sensing electrode and a second connection electrode connecting to the second sensing electrode,
   wherein an insulating layer is disposed on the first connection electrode so as to expose a part of the first connection electrode and the second connection electrode disposed on the insulating layer,
   wherein the cover substrate is bent to have a partial flat surface and a partial curved surface, and the end of the cover substrate is bent to have a curved surface.

2. The touch panel of claim 1, wherein the second intermediate layer comprises an inorganic substance.

3. The touch panel of claim 1, wherein the first sensing electrode and the second sensing electrode comprise metal.

4. The touch panel of claim 1, wherein the wire electrode is disposed on the second intermediate layers corresponding to the unactive area.

5. The touch panel of claim 1, wherein the first sensing electrode and the second sensing electrode are in direct contact with the second intermediate layer.

6. The touch panel of claim 1, wherein the first connection electrode is in direct contact with the second intermediate layer.

7. The touch panel of claim 1, wherein the second intermediate layer comprises a first sub-second intermediate layer on the first intermediate layer and a second sub-second intermediate layer on the first sub-second intermediate layer, and the first sub-second intermediate layer has a refractive index different from a refractive index of the second sub-second intermediate layer.

8. The touch panel of claim 7, wherein the refractive index of the first sub-second intermediate layer is greater than the refractive index of the second sub-second intermediate layer.

9. The touch panel of claim 1, wherein the wire electrode is disposed on the printing layer to transfer a signal to the electrode.

10. The touch panel of claim 1, further comprising a third intermediate layer interposed between the first intermediate layer and the cover substrate, wherein the first intermediate layer has a thickness in a range of 2 μm to 2.5 μm, and the third intermediate layer has a thickness in a range of 1 nm to 10 nm.

11. A touch device comprising:
    a first substrate;
    a thin film transistor on the first substrate;
    an organic light emitting device on the thin film transistor;
    an encapsulation substrate on the organic light emitting device; and
    a touch window on the encapsulation substrate,
    wherein the organic light emitting device includes a self light-emitting device,
    wherein the touch panel includes:
    a cover substrate including an active area and an unactive area;
    a printing layer under the unactive area of the cover substrate;
    a first intermediate layer under the active area and the unactive area of the cover substrate, and comprising an organic substance;
    a second intermediate layer under the first intermediate layer, and the second intermediate layer disposed between the first intermediate layer and encapsulation substrate;
    a connection electrode on the second intermediate layer corresponding to the active area;
    a sensing electrode on the second intermediate layer corresponding to the active area; and
    a wire electrode disposed on at least one of the first and second intermediate layers corresponding to the unactive area and connected to the sensing electrode,
    wherein the sensing electrode includes a first sensing electrode and a second sensing electrode extending in different directions on the same surface of the second intermediate layer,
    wherein the connection electrode includes a first connection electrode connecting to the first sensing electrode and a second connection electrode connecting to the second sensing electrode,
    wherein an insulating layer is disposed on the first connection electrode so as to expose a part of the first connection electrode and the second connection electrode disposed on the insulating layer, wherein the cover substrate is bent to have a partial flat surface and a partial curved surface, and the end of the cover substrate is bent to have a curved surface.

12. The touch device of claim 11, wherein the second intermediate layer comprises an inorganic substance.

13. The touch device of claim 11, wherein the first sensing electrode and the second sensing electrode comprise metal.

14. The touch device of claim 11, wherein the wire electrode is disposed on the second intermediate layers corresponding to the unactive area.

15. The touch device of claim 11, wherein the first sensing electrode and the second sensing electrode are in direct contact with the second intermediate layer.

16. The touch device of claim 11, wherein the first connection electrode is in direct contact with the second intermediate layer.

17. The touch device of claim 11, wherein the second intermediate layer comprises a first sub-second intermediate layer on the first intermediate layer and a second sub-second intermediate layer on the first sub-second intermediate layer, and the first sub-second intermediate layer has a refractive index different from a refractive index of the second sub-second intermediate layer.

18. The touch device of claim 17, wherein the refractive index of the first sub-second intermediate layer is greater than the refractive index of the second sub-second intermediate layer.

19. The touch device of claim 11, wherein the wire electrode is disposed on the printing layer to transfer a signal to the electrode.

20. The touch device of claim 11, further comprising a third intermediate layer interposed between the first intermediate layer and the cover substrate, wherein the first intermediate layer has a thickness in a range of 2 μm to 2.5 μm, and the third intermediate layer has a thickness in a range of 1 nm to 10 nm.

* * * * *